United States Patent
De Vansa Vikramaratne et al.

(10) Patent No.: US 11,163,834 B2
(45) Date of Patent: Nov. 2, 2021

(54) FILTERING COLLABORATION ACTIVITY

(71) Applicant: Box, Inc., Redwood City, CA (US)

(72) Inventors: Victor De Vansa Vikramaratne, Sunnyvale, CA (US); Sesh Jalagam, Union City, CA (US)

(73) Assignee: Box, Inc., Redwood City, CA (US)

( * ) Notice: Subject to any disclaimer, the term of this patent is extended or adjusted under 35 U.S.C. 154(b) by 45 days.

(21) Appl. No.: 16/136,207

(22) Filed: Sep. 19, 2018

(65) Prior Publication Data

US 2020/0074015 A1  Mar. 5, 2020

Related U.S. Application Data

(60) Provisional application No. 62/723,913, filed on Aug. 28, 2018.

(51) Int. Cl.
*G06F 7/00* (2006.01)
*G06F 16/00* (2019.01)
*G06F 16/904* (2019.01)
*H04L 29/08* (2006.01)
*G06F 21/62* (2013.01)
*G06F 16/901* (2019.01)

(52) U.S. Cl.
CPC .......... *G06F 16/904* (2019.01); *G06F 16/901* (2019.01); *G06F 21/6218* (2013.01); *H04L 67/22* (2013.01)

(58) Field of Classification Search
None
See application file for complete search history.

(56) References Cited

U.S. PATENT DOCUMENTS

| | | |
|---|---|---|
| 7,039,642 B1 | 5/2006 | Horvitz et al. |
| 7,669,123 B2 | 2/2010 | Zuckerberg et al. |
| 8,381,306 B2 | 2/2013 | McPherson et al. |
| 9,805,042 B1 | 10/2017 | Meyer |
| 9,824,094 B1 | 11/2017 | Meyer |
| 9,990,365 B1 | 6/2018 | Kilpatrick |

(Continued)

OTHER PUBLICATIONS

Non-Final Office Action dated Nov. 1, 2019 for U.S. Appl. No. 16/136,196.

(Continued)

*Primary Examiner* — Tuan A Pham
(74) *Attorney, Agent, or Firm* — Vista IP Law Group, LLP

(57) ABSTRACT

Systems and methods for filtering collaboration activity to present in an activity feed. A cloud-based collaboration system is configured to identify collaboration interactions that users have taken over collaboration objects. Some of the collaboration objects or interactions are subject to access permissions as well as policy-based access rules. When a subject user interacts with a user interface, system components select a first set of user interaction events that in some way pertain to the subject user. A first filtering pass applies a first filter to determine object access permissions. After reducing the first set to a smaller second set, then a second filter corresponding to policy-based access rules is applied to the second set to form a still smaller third set of user interaction events. Characteristics of user interaction events in the third set are used to generate user-specific activity feed entries that are presented in a user interface.

20 Claims, 12 Drawing Sheets

(56) References Cited

U.S. PATENT DOCUMENTS

| | | |
|---|---|---|
| 10,074,015 B1 | 9/2018 | Grundmann et al. |
| 10,102,305 B1 | 10/2018 | Chang |
| 10,218,784 B2 | 2/2019 | Ju |
| 10,452,993 B1 | 10/2019 | Hart |
| 2002/0069360 A1 | 6/2002 | Thoone et al. |
| 2002/0120734 A1 | 8/2002 | Riosa |
| 2004/0054566 A1 | 3/2004 | J'Maev |
| 2005/0010593 A1 | 1/2005 | Fellenstein |
| 2005/0235318 A1 | 10/2005 | Grauch et al. |
| 2006/0161543 A1 | 7/2006 | Feng |
| 2007/0283443 A1* | 12/2007 | McPherson ......... G06F 21/6218 726/26 |
| 2008/0077462 A1* | 3/2008 | Patel .................. G06Q 30/0237 705/7.33 |
| 2008/0183665 A1 | 7/2008 | Brinker |
| 2008/0195587 A1 | 8/2008 | Hussami |
| 2009/0164537 A1 | 6/2009 | Huang |
| 2009/0248615 A1 | 10/2009 | Drory |
| 2012/0192086 A1 | 7/2012 | Ghods |
| 2012/0233096 A1 | 9/2012 | Gupta |
| 2012/0297313 A1* | 11/2012 | Sharma ................. G06Q 10/10 715/751 |
| 2013/0179381 A1 | 7/2013 | Kawabata |
| 2013/0179799 A1 | 7/2013 | Savage |
| 2013/0262598 A1 | 10/2013 | Makanawala |
| 2013/0297689 A1 | 11/2013 | Bhat |
| 2013/0311467 A1 | 11/2013 | Galle et al. |
| 2013/0318593 A1* | 11/2013 | Smith ................... G06F 16/907 726/9 |
| 2013/0332195 A1* | 12/2013 | Galuten ................ G16H 50/80 705/3 |
| 2014/0006977 A1 | 1/2014 | Adams |
| 2014/0081904 A1 | 3/2014 | Sitrick |
| 2014/0327622 A1 | 11/2014 | Ouyang |
| 2015/0134693 A1 | 5/2015 | Chan |
| 2015/0207701 A1 | 7/2015 | Faaborg |
| 2015/0331578 A1 | 11/2015 | Keslin |
| 2016/0065627 A1* | 3/2016 | Pearl ....................... G06F 16/14 709/204 |
| 2016/0098390 A1 | 4/2016 | Kitajima |
| 2016/0321311 A1* | 11/2016 | Tallamraju .......... H04L 67/1097 |
| 2016/0373476 A1 | 12/2016 | Dell'anno et al. |
| 2017/0139550 A1 | 5/2017 | Milvaney |
| 2017/0168692 A1* | 6/2017 | Chandra ................. G06F 3/017 |
| 2017/0185687 A1 | 6/2017 | Pai et al. |
| 2018/0062852 A1* | 3/2018 | Schmahmann ........... H04L 9/14 |
| 2018/0284959 A1 | 10/2018 | Alphin et al. |
| 2018/0349623 A1 | 12/2018 | Morard et al. |
| 2019/0130031 A1 | 5/2019 | Gourley |

OTHER PUBLICATIONS

Final Office Action dated Mar. 13, 2019 for U.S. Appl. No. 16/136,196.
Non-Final Office Action dated Dec. 12, 2019 for U.S. Appl. No. 16/136,200.
Activity Stream—Wikipedia, URL:https://en.wikipedia.org/wiki/Activity_stream, Oct. 28, 2019.
Tata, Sandeep, et al. "Quick access: building a smart experience for Google drive." Proceedings of the 23rd ACM SIGKDD International Conference on Knowledge Discovery and Data Mining. ACM, 2017.
Non-Final Office Action dated May 30, 2019 for U.S. Appl. No. 15/728,486.
Final Office Action dated Sep. 30, 2019 for U.S. Appl. No. 15/728,486.
Non-Final Office Action dated Mar. 20, 2020 for U.S. Appl. No. 16/264,357.
Final Office Action dated Mar. 13, 2020 for U.S. Appl. No. 16/136,196.
Final Office Action dated Jul. 15, 2021 for U.S. Appl. No. 16/136,196.
Final Office Action dated Aug. 6, 2021 for U.S. Appl. No. 16/264,357.
Final Office Action dated Jul. 13, 2020 for U.S. Appl. No. 16/264,357.
Notice of Allowance dated Jul. 27, 2020 for U.S. Appl. No. 16/136,200.
Final Office Action dated Nov. 9, 2020 for U.S. Appl. No. 16/136,207.
Non-Final Office Action dated Mar. 10, 2021 for U.S. Appl. No. 16/136,196.
Non-Final Office Action dated Apr. 16, 2021 for U.S. Appl. No. 16/264,357.

* cited by examiner

FILTERING COLLABORATION ACTIVITY

CROSS-REFERENCE TO RELATED APPLICATION(S)

The present application claims the benefit of priority to U.S. Patent Application Ser. No. 62/723,913 titled "FILTERING COLLABORATION ACTIVITY", filed Aug. 28, 2018, which is hereby incorporated by reference in its entirety.

This application is related to U.S. patent application Ser. No. 16/136,196 titled "PRESENTING COLLABORATION ACTIVITIES", filed on Sep. 19, 2018, and U.S. patent application Ser. No. 16/136,200 titled "CURATING COLLABORATION ACTIVITY", filed on Sep. 19, 2018, which are hereby incorporated by reference in their entirety.

FIELD

This disclosure relates to collaboration systems, and more particularly to techniques for high-performance filtering of collaboration activity.

BACKGROUND

In modern enterprises, the benefits of user collaboration can be enhanced by providing users with a view of the activities of other users. In such enterprise settings, a computing system (e.g., cloud-based content management platform) may be configured to aid in user collaboration by monitoring user activity and reporting summaries of user activities in a user interface. Often, user activities involve interactions (e.g., authoring, commenting, sharing) by the users over computer-readable content objects (e.g., text files, spreadsheets, mixed text and graphics documents, programming code files, etc.). User activities may also pertain to explicit user-to-user interactions (e.g., messaging actions, chatting, object sharing invitations, etc.) and/or implicit user-to-user relationships (e.g., based on organizational structures). Indications of user interaction events (e.g., user interactions over content objects and/or user interactions with other users) sometimes take the form of activity listings that offer visibility into certain aspects of other users' interactions. For example, activity listings for a particular subject user might show that several colleagues (e.g., other users in the same department) have been editing a certain presentation over the past several days.

Such activity listings are presented to compel the subject user to take some action to initiate new interactions (e.g., with a content object and/or with another user) that would be beneficial to the efficiency, creativity, and/or productivity of the enterprise. In a shared content management and collaboration environment, any interaction event invoked by the user will be governed by the user and/or content access permissions derived from the underlying data security policies that are associated with the user. Such policy-based access permissions models (e.g., rule base) can be complex, but are nevertheless often required to be applied each and every time some form of user and/or content interaction is invoked. In many cases, an activity listing that is capable of producing the aforementioned desired collaboration response from a particular user would at least permit the user to take some action (e.g., view, click, navigate to the underlying content objects, message the underlying users, etc.) on the activity listing even when complex policy-based access permissions are in place.

Unfortunately, in highly active environments with many users and content objects, the time and computing resources that are consumed by processing and presenting such actionable collaboration activity listings can reach unacceptable levels. Specifically, in such highly active environments, determining user-specific activity listings that comply with a complex permissions model places unacceptable levels of demand on the resources of the computing system. Approaches that fail to address these high levels of computing resource demands that are brought to bear by complex permissions models become more and more deficient as the corpus of collaboration activity becomes larger and larger. What is needed is an improved way of presenting collaboration activity knowledge to users in highly active environments.

SUMMARY

The present disclosure describes techniques used in systems, methods, and in computer program products for filtering collaboration activity, which techniques advance the relevant technologies to address technological issues with legacy approaches. More specifically, the present disclosure describes techniques used in systems, methods, and in computer program products for two-stage generation of collaboration activity listings. Certain embodiments are directed to technological solutions for filtering user interaction events in two stages so as to reduce the number of events over which policy-based access permissions are applied when generating user activity listings.

The disclosed embodiments modify and improve over legacy approaches. In particular, the herein-disclosed techniques provide technical solutions that address the technical problems attendant to unacceptably high usage of computing resources when presenting collaboration activities to users in highly active environments. Such technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication. For example, by using the herein-disclosed techniques recommendations made to users are recommendations that can be acted on by the user, thus relieving the user of the frustration of wasted time and computing resources to follow a recommendation, only to find out that the objects of the recommendation cannot be acted upon.

Some embodiments disclosed herein use techniques to improve the functioning of multiple systems within the disclosed environments, and some embodiments advance peripheral technical fields as well. As specific examples, use of the disclosed computer equipment, networking equipment, and constituent devices within the shown environments as described herein and as depicted in the figures provide advances in the technical field of hierarchical data storage access techniques as well as advances in various technical fields related to human-machine interfaces.

Further details of aspects, objectives, and advantages of the technological embodiments are described herein, and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
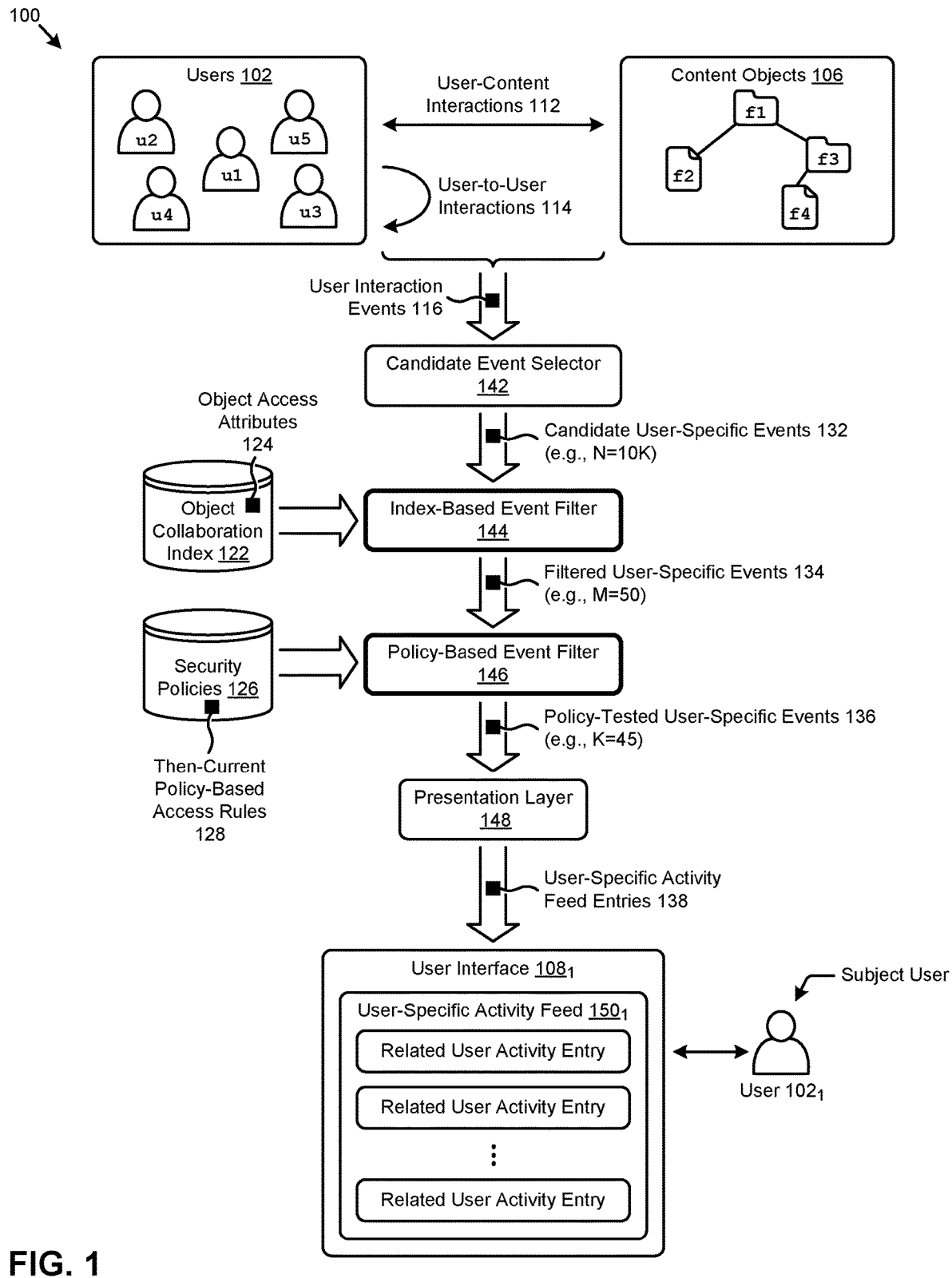
FIG. 1 illustrates a computing environment in which embodiments of the present disclosure can be implemented.

Embodiments in accordance with the present disclosure address the problem of unacceptably high usage of computing resources when presenting collaboration activities to users in highly active environments. Some embodiments are directed to approaches for filtering user interaction events in two stages so as to reduce the number of events over which policy-based access permissions are applied when generating user activity listings. The accompanying figures and discussions herein present example environments, systems, methods, and computer program products for two-stage generation of collaboration activity listings.

Overview

Disclosed herein are techniques for filtering user interaction events in two stages so as to reduce the number of events over which policy-based access permissions are applied when generating user-specific activity listings. In certain embodiments, such techniques are implemented in a content management system that facilitates user-to-user interactions and user-content interactions over a plurality of users and a plurality of content objects. The content management system provisions access to the users and/or content objects in accordance with a set of policy-based access rules. User interaction events that correspond to the user-to-user interactions and/or user-content interactions are captured at the system. To generate an activity listing for a subject user, a set of candidate user-specific events for the subject user are selected from the user interaction events.

For example, in a highly active environment, the user interaction events involving the top 100 users and top 100 content objects most closely associated with a subject user are selected. Rather than apply the policy-based access rules to this large set of events (e.g., 10,000 events) to determine whether the subject user can access the underlying users and/or content objects of the events, the candidate user-specific events are filtered in accordance with the content object permissions and/or user access permissions inherent in the underlying user interaction events. In certain embodiments, this first filtering operation can be facilitated by a collaboration index that improves the performance of lookup operations when determining specified directory- and/or object-specific permissions and/or when determining parent-to-child inheritance of permissions from, for example, folders to constituent files.

After performing the first filtering operation, the then-current policy-based access rules are applied to a reduced set (e.g., 50 events rather than 10,000 events) of filtered user-specific events. By applying the policy-based access rules, the accessibility by the subject user to the underlying users and/or content objects of the user-specific events is confirmed. As an example, a further reduced set (e.g., 45 events) of policy-tested user-specific events might be derived from the filtered user-specific events based at least in part on applying the policy-based access rules. A set of user-specific activity listings are generated from the policy-tested user-specific events and processed for presentation to the subject user. In certain embodiments, the user-specific activity listings are user-specific feed entries that are presented to the subject user in a collaboration activity feed.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1 illustrates a computing environment 100 in which embodiments of the present disclosure can be implemented. As an option, one or more variations of computing environment 100 or any aspect thereof may be implemented in the context of the architecture and functionality of the embodiments described herein.

FIG. 1 illustrates one aspect pertaining to filtering user interaction events in two stages so as to reduce the number of events over which policy-based access permissions are applied when generating user activity listings. Specifically, the figure presents a logical depiction of how the herein disclosed techniques can be used in a computing environment to efficiently derive user-specific activity feeds for a subject user from a large corpus of collaboration activity.

The logical depiction of FIG. 1 illustrates a selected set of users (e.g., user "u1", user "u2", user "u3", user "u4", and user "u5") from a plurality of users 102 that interact with each other through instances of user-to-user interactions 114. For example, a first user might invite a second user to collaborate on some task, and/or might request to join a group of other users. A user-to-user interaction may also be based on an implicit user-to-user relationships (e.g., based on organizational structures). Any of the users 102 might also invoke certain instances of user-content interactions 112 with various instances of content objects 106 (e.g., folder "/f1", file "f2", folder "/f3", and file "f4").

As an example, a first user might create a document and then share the document with other users for viewing, editing, or commenting by the other users. For a user-to-user interaction the "collaboration object" is another user, whereas for a user-content interaction the "collaboration object" is a content object. The efficiency, productivity, and creativity of the users 102 can be enhanced by knowledge of the user interaction events that correspond to the foregoing collaboration activities (e.g., user-content interactions 112, user-to-user interactions 114) as performed by other users. Based on the knowledge of such user interaction events, a particular user might be compelled to initiate a new user interaction event that is beneficial to the members of a particular collaboration group.

Indications of user interaction events sometimes take the form of activity listings that offer visibility into certain aspects of other users' interactions. For example, certain activity listings presented to a particular subject user might show that several colleagues (e.g., other users in the same department) have been editing a certain presentation over the past several days. In some embodiments, the activity listings are organized for presentation to the subject user in a user-specific activity feed. A user-specific activity feed is a sequence of activity feed entries that characterize one or more user interaction events. Specifically, a first activity feed entry might comprise a message that describes a particular user interaction event (e.g., "Lisa edited file AAA.pptx"), while a second activity feed entry might comprise a message that summarizes multiple user interaction events (e.g., "Bob and 3 others viewed file BBB.docx"). In certain embodiments, the user-specific activity feed is presented in a manner similar to an "Inbox" of an email application. Processing the activity feed entries for an "Inbox" display might include operations pertaining to filtering, sorting, decorating, and/or other operations.

Further details regarding general approaches to presentation of user interaction events in an "Inbox" are described in U.S. application Ser. No. 16/017,838, filed on Jun. 25, 2018, titled "PRESENTING COLLABORATION ACTIVITY", which is hereby incorporated by reference in its entirety.

Further details regarding general approaches to processing activity feeds are described in described in U.S. application Ser. No. 15/728,486, filed on Oct. 9, 2017, titled "COLLABORATION ACTIVITY SUMMARIES", which is hereby incorporated by reference in its entirety.

As earlier mentioned, user-to-user interactions and user-content interactions might be facilitated by a content management system (e.g., a distributed computing and storage platform or a cloud-based content management platform) which will implement various techniques for securely provisioning access to the users 102 and/or the content objects 106 associated with the interactions. One such technique implements a set of security policies (e.g., security policies 126) to govern the user interactions and/or access to the underlying collaboration objects (e.g., users, content objects, etc.). The security policies often constitute a contractual agreement between the content management system and its clients that describes how the content management system is to manage the property (e.g., content objects, user privacy, etc.) of the clients. To comply with the security policies, various policy-based access rules derived from the security policies are consulted to determine whether a particular interaction with a collaboration object is to be permitted.

Such policy-based access permissions models can be complex. For example, tens of thousands of lines of programming code might be implemented to test whether access to a particular object is in compliance with a set of associated security policies. Any activity feed entry in a user-specific activity feed that is capable of producing the aforementioned desired collaboration response from a particular user would at least permit the user to take some action on (e.g., view, click, navigate to the underlying content objects, message the underlying users, etc.) the activity feed entry even when complex policy-based access permissions are in place. However, in highly active environments with many users and content objects, the time and computing resources that are consumed by processing and presenting such actionable activity feed entries can reach unacceptable levels.

The herein disclosed techniques address such issues pertaining to unacceptably high usage of computing resources when presenting user-specific activity feeds to users in highly active environments. As shown in FIG. 1, a candidate event selector 142 is implemented to select a set of candidate user-specific events 132 from a set of user interaction events 116 that correspond to user-to-user interactions 114 and/or user-content interactions 112. The candidate user-specific events 132 might be selected based at least in part on the users most closely related to a subject user (e.g., user $102_1$) and the content objects associated with each of the related users. In a highly active environment, for example, applying such selection criteria to the large corpus of user interaction events might result in 10,000 candidate user-specific events.

Rather than apply a set of complex policy-based access rules (e.g., derived from security policies 126) to each event of this large set of events to determine whether a particular event can produce an actionable activity feed entry, the candidate user-specific events 132 are filtered by an index-based event filter 144. Specifically, the index-based event filter 144 looks up object access permissions (e.g., from object access attributes 124) that characterize the content object permissions and/or user access permissions inherent in the candidate user-specific events 132. The object access attributes 124 are used to select a set of filtered user-specific events 134 that comprise collaboration objects that are accessible by the subject user. In certain embodiments, an object collaboration index 122 is implemented to organize and/or store the object access attributes 124 so as to reduce the latency of operations performed at the index-based event filter 144. For example, data manipulation operations (e.g., lookup operations, query operations, JOINs, etc.) executed over the object collaboration index 122 can be characterized as having a low latency.

A set of then-current policy-based access rules 128 are then applied by a policy-based event filter 146 to a reduced set (e.g., 50 events rather than 10,000 events) of filtered user-specific events 134. By applying the policy-based access rules, the accessibility by the subject user to the underlying users and/or content objects of the user-specific events is confirmed in accordance with the security policies 126 that have been established. In most cases, a set of policy-tested user-specific events 136 produced by the policy-based event filter 146 is equivalent to the set of filtered user-specific events 134. In some cases, however, the policy-tested user-specific events 136 are a subset (e.g., 45 events) of the filtered user-specific events 134. In these cases, one or more differences exist between a then-current state of computing environment 100 and an earlier state of computing environment 100 that results in one or more filtered use-specific events no longer being compliant with the then-current policy-based access rules 128. As an example, a subject user role change may result in a then-current inability to access a particular content object that was earlier accessible, thereby precluding any filtered user-specific events pertaining to the content object from the set of policy-tested user-specific events.

In this and some other embodiments, the policy-based access rules are logical constructs that codify organizational policies that pertain to organizational divisions (e.g., departments), geographic boundaries (e.g., interactions between sites, domestic versus international data transmission rules, etc.), and titles or roles. Such policy-based access rules may change over time asynchronously with changes to the aforementioned index. More specifically, permissions pertaining to objects referred to in the index can change independently from policy-based access rules. Policy-based access rules are applied to supersede object access permissions. As an example, while a user might be permitted to access a particular object due to a permissions entry or entries in the index, a policy-based access rule might supersede all applicable object access permissions such that the user would not be able to access the object in spite of access permissions being recorded in the index. This can happen, for example, when a user changes role, or is assigned to a different department, or moves to a different country that is subject to different compliance laws. Since the policy-based access rules can supersede object access permissions, and since the computing resources needed to apply the policy-based access rules are often significant, the policy-based access rules are applied only after application of object access permissions, thus reducing the number of interactions to be tested by the policy-based access rules, thus reducing the computing resources demanded as compared to other approaches.

After the policy-based access rules have been applied, actionable activity feed entries can be presented to the subject user by processing the resulting policy-tested user-specific events 136 to generate a set of user-specific activity feed entries 138. As shown, the user-specific activity feed entries 138 can then be processed in a presentation layer 148 to be presented as a listing of related user activity entries in a user-specific activity feed $150_1$ displayed in a user interface $108_1$ for viewing and/or interaction by the subject user (e.g., user $102_1$).

The user-specific activity feed $150_1$ generated by the herein disclosed techniques presents user-specific collaboration activity to users in highly active environments without consuming unacceptably high levels of computing resources. As such, application of the techniques disclosed herein facilitate improvements in computer functionality that serve to reduce the demand for computer memory, reduce the demand for computer processing power, reduce network bandwidth use, and reduce the demand for inter-component communication. Specifically, consumption of such computing resources to apply complex policy-based access rules to a large corpus of user interaction events to identify actionable activity feed entries is eliminated.

One embodiment of techniques for filtering of collaboration activity (e.g., user interaction events) is disclosed in further detail as follows.

Figure 2:
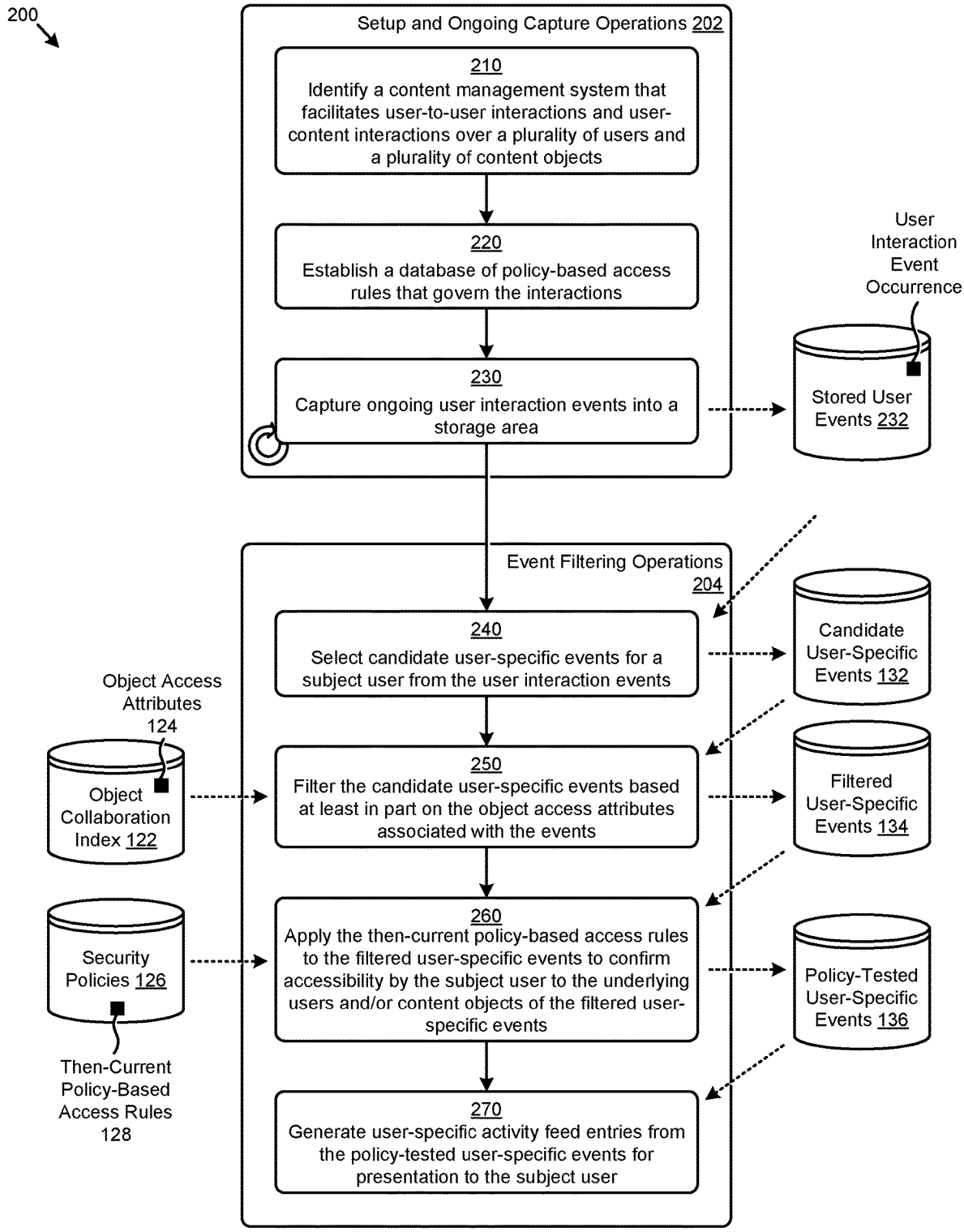
FIG. 2 depicts a collaboration activity filtering technique as implemented in systems that facilitate two-stage generation of collaboration activity listings.

FIG. 2 depicts a collaboration activity filtering technique 200 as implemented in systems that facilitate two-stage generation of collaboration activity listings. As an option, one or more variations of collaboration activity filtering technique 200 or any aspect thereof may be implemented in the context of the architecture and functionality of the embodiments described herein. The collaboration activity filtering technique 200 or any aspect thereof may be implemented in any environment.

FIG. 2 illustrates one aspect pertaining to filtering user interaction events in two stages so as to reduce the number of events over which policy-based access permissions are applied when generating user activity listings. Specifically, the figure is being presented with respect to its contribution to addressing the problem of unacceptably high usage of computing resources when presenting collaboration activities to users in highly active environments.

The collaboration activity filtering technique 200 shown in FIG. 2 presents a set of setup and ongoing capture operations 202 and a set of event filtering operations 204. The event filtering operations include the aforementioned two-stage approach to applying permissions.

As shown, the setup and ongoing capture operations of the collaboration activity filtering technique 200 can commence by identifying a content management system that facilitates various user-to-user interactions and user-content interactions over a plurality of users and a plurality of content objects (step 210). For example, the content management system might be a cloud-based shared content platform that stores and provides access to content objects over a distributed computing and storage system. The users might subscribe to the aforementioned content management system to interact with (e.g., create, edit, view, etc.) the content objects as individuals and/or as groups of collaborators.

A set of policy-based access rules that govern the foregoing user interactions is established (step 220). The policy-based access rules might be derived from a set of security policies that characterize how the content management system is to constrain the access to the content objects and the users. A set of interaction attributes and a set of object access attributes associated with user interaction events corresponding to the user interactions are recorded (step 230). The interaction attributes might characterize occurrences of certain user interaction events. For example, a first particular user might be "collabed-in" to a set of content objects that are owned by a second particular different user. User-to-user interactions can be recorded in persistent storage such as in the shown stored user events 232. The stored user events can be made accessible for further ongoing access. As another example, the interaction attributes might characterize occurrence of a particular user's particular action (e.g., READ, WRITE) taken on a particular content object (e.g., file, folder, etc.).

Object access attributes 124 are specific to a particular object or type of objects. For example, an object access attribute might describe object access permissions (e.g., READ, WRITE) that are associated with and/or resulting from particular types of user interaction events (e.g., permission to READ in a preview, permission to READ the source object, permission to WRITE to the source document, permission to ADD a comment to a source document etc.).

Object access permissions are object access conditions that allow or deny interaction by a particular user to a particular file or folder that is stored in an index. In this embodiment, the index is included as a part of a file system. In one variation, the index is or can be a database that includes tables with rows that indicate object access conditions for a particular user to access a particular object.

The event filtering operations 204 of the collaboration activity filtering technique 200 can commence by selecting a set of candidate user-specific events for a subject user from the user interaction events (step 240). For example, the candidate user-specific events 132 might comprise user interaction events associated with the top 100 most active users related to the subject user and most accessed content objects for each of the related users. The candidate user-specific events are filtered based at least in part on a set of object access attributes associated with the events (step 250). As shown, a set of object access attributes 124 stored in an object collaboration index 122 might be consulted to perform the filtering. Such index-based filtering can be implemented so as to efficiently generate a set of filtered events (e.g., the shown filtered user-specific events 134) from the often very large set of candidate user-specific events. In some implementations, filtering can be performed in "batches". In a batch scenario, a query to the object collaboration index 122 might include a group of objects, which objects can be processed over the object collaboration index 122 as a group, thus reducing the number of queries to be issued in order to perform the filtering. The batches or groups can be formed with a particular constituency so as increase the likelihood that the query can be processed without memory or disk I/O thrashing.

A collection of then-current policy-based access rules are applied to the filtered user-specific events to confirm accessibility by the subject user to the underlying collaboration objects (e.g., users, content objects, etc.) of the filtered user-specific events (step 260). As can be observed, the then-current policy-based access rules 128 derived from security policies 126 can be applied to the filtered user-specific events 134 to identify a set of policy-tested user-specific events 136. The policy-tested user-specific events are used to generate user-specific activity feed entries to present to the subject user (step 270).

In many cases, the generated user-specific activity feed entries include facts or representations of facts that aid in human understanding of the semantics underlying the feed entry. For example, a proposed feed entry might indicate that "User Joe accessed folder "Docs" on Apr. 28, 2019", however it might happen that user Joe had established privacy settings such that Joe's activities are not shared with other users. As such, in this illustrative example, even though both Joe and the subject user have folder permissions to access the folder "Docs", the dissemination of the fact that Joe accessed folder "Docs" might be disallowed. In such situations, the policy-testing of user-specific events can be performed in a second pass, after generation of the facts that are included in the user-specific activity feed entries.

As an alternative embodiment, some or all of the operations of step 270, specifically operations to generate user-specific activity feed entries might be performed prior to performing step 260. As such, the then-current policy-based access rules can be applied to the user-specific activity feed entries themselves events so as to confirm accessibility by the subject user to view any fact or other characteristic of the feed entry.

Various techniques for generating user-specific activity feed entries to present to a subject user are described hereunder. The examples given herein are merely illustrative and other techniques and example presentations of user-specific activity feed entries are possible.

One embodiment of a system for implementing the collaboration activity filtering technique of FIG. 2 is disclosed as follows.

Figure 3A:
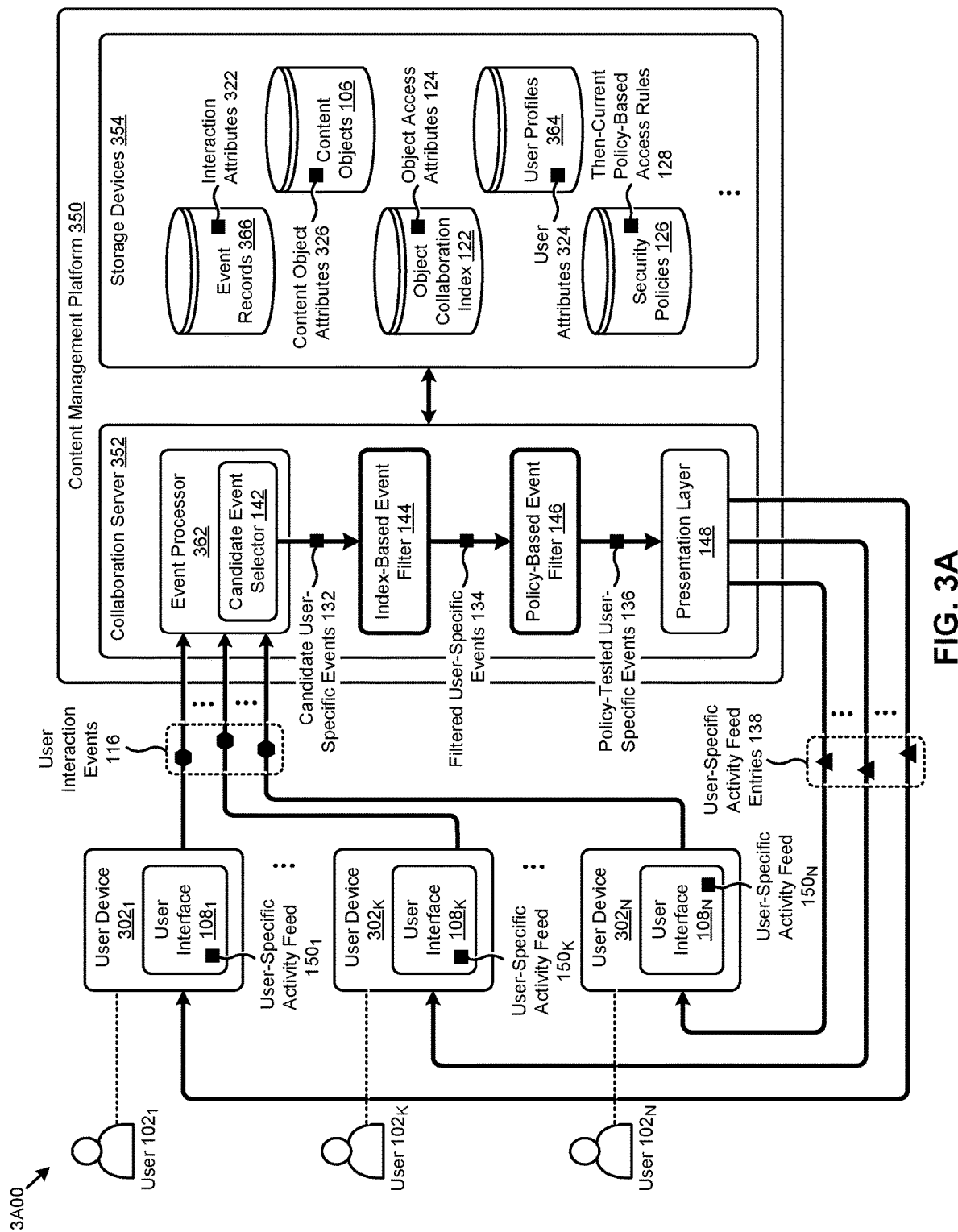
FIG. 3A depicts a computing system for two-stage generation of collaboration activity listings, according to some embodiments.

FIG. 3A depicts a computing system 3A00 for two-stage generation of collaboration activity listings. As an option, one or more variations of computing system 3A00 or any aspect thereof may be implemented in the context of the architecture and functionality of the embodiments described herein. The computing system 3A00 or any aspect thereof may be implemented in any environment.

FIG. 3A illustrates one aspect pertaining to filtering user interaction events in two stages so as to reduce the number of events over which policy-based access permissions are applied when generating user activity listings. Specifically, the figure is being presented to show one embodiment of certain representative components, data structures, and associated data flows that describe how the herein disclosed techniques might be implemented in a computing system. The components, data structures, and data flows shown in FIG. 3A present one partitioning and associated data manipulation approach. The specific example shown is purely exemplary, and other subsystems, data structures, and/or partitionings are reasonable.

As shown, the computing system 3A00 comprises an instance of the index-based event filter 144, the policy-based event filter 146, and the presentation layer 148 earlier described operating at an instance of a collaboration server 352 in a content management platform 350. The candidate event selector 142 is also shown as a component of an event processor 362 operating at the collaboration server 352.

A plurality of instances of the foregoing components might operate at a plurality of instances of the collaboration server 352 in the content management platform 350 and/or any portion of computing system 3A00. Such instances can access a set of storage devices 354 that store various information that facilitates operation of the computing system 3A00 and/or implementation of the herein disclosed techniques. For example, the collaboration server 352 might facilitate access to shared content in content objects 106 by a plurality of users (e.g., user $102_1$, . . . , user $102_K$, . . . , user $102_N$) from a respective set of user devices (e.g., user device $302_1$, . . . , user device $302_K$, . . . , user device $302_N$). The objects (e.g., files, folders, etc.) in content objects 106 are characterized at least in part by a set of content object attributes 326 (e.g., content object metadata) stored at the storage devices 354. Furthermore, the users are characterized at least in part by a set of user attributes 324 stored in a set of user profiles 364 at storage devices 354. The object collaboration index 122 comprising object access attributes 124 and the security policies 126 comprising then-current policy-based access rules 128 are also shown in storage devices 354.

In some cases, the users can interact with user interfaces or application workspaces (e.g., user interface $108_1$, . . . , user interface $108_K$, . . . , user interface $108_N$) at the user devices to invoke the user interaction events 116 at the computing system 3A00. The event processor 362 at the collaboration server 352 can detect the user interaction events 116 invoked by the plurality of users. The event processor 362 can codify certain interaction attributes 322 pertaining to the user interaction events 116 in a set of event records 366 stored in the storage devices 354. In some cases, event processor 362 will access the user attributes 324 (e.g., user identifiers, etc.) stored in user profiles 364 and/or the content object attributes 326 (e.g., content object identifiers, etc.) stored in content objects 106 to facilitate populating the event records 366.

In accordance with the herein disclosed techniques, the event records 366 and/or other information at the content management platform 350 are accessed to generate instances of user-specific activity feed entries 138 that are delivered to user-specific activity feeds (e.g., user-specific activity feed $150_1$, . . . , user-specific activity feed $150_K$, . . . , user-specific activity feed $150_N$) of the respective subject users. Specifically, the candidate event selector 142 accesses the event records 366 and/or other information to select a set of candidate user-specific events 132 that pertain to each of the subject users. The user attributes 324 of the subject user and/or other users might be accessed to determine the candidate user-specific events 132. A first filter, the index-based event filter 144, uses the object access attributes 124 at the object collaboration index 122 and/or other information to filter the candidate user-specific events 132 to produce a set of filtered user-specific events 134.

Further details regarding general approaches to capturing event records and/or storing user-specific activity are described in U.S. application Ser. No. 16/051,447, filed on Jul. 31, 2018, titled "SPONTANEOUS NETWORKING", which is hereby incorporated by reference in its entirety.

A second filter, the policy-based event filter 146, applies the then-current policy-based access rules 128 and/or other information to the filtered user-specific events 134 to generate a set of policy-tested user-specific events 136. Such policy-tested user-specific events represent the user interaction events from the corpus of user interaction events at computing system 3A00 that comprise underlying users and/or content objects that are accessible by the subject users in accordance with the established security policies (e.g., security policies 126). The presentation layer 148 derives the user-specific activity feed entries 138 from the policy-tested user-specific events 136 to present a relevant and actionable collaboration activity feed to the subject users.

The foregoing discussions include techniques for performing various operations over user interaction events, such as recording certain attributes pertaining to the events (e.g., step 230 of FIG. 2), which techniques are disclosed in further detail as follows.

Figure 3B:
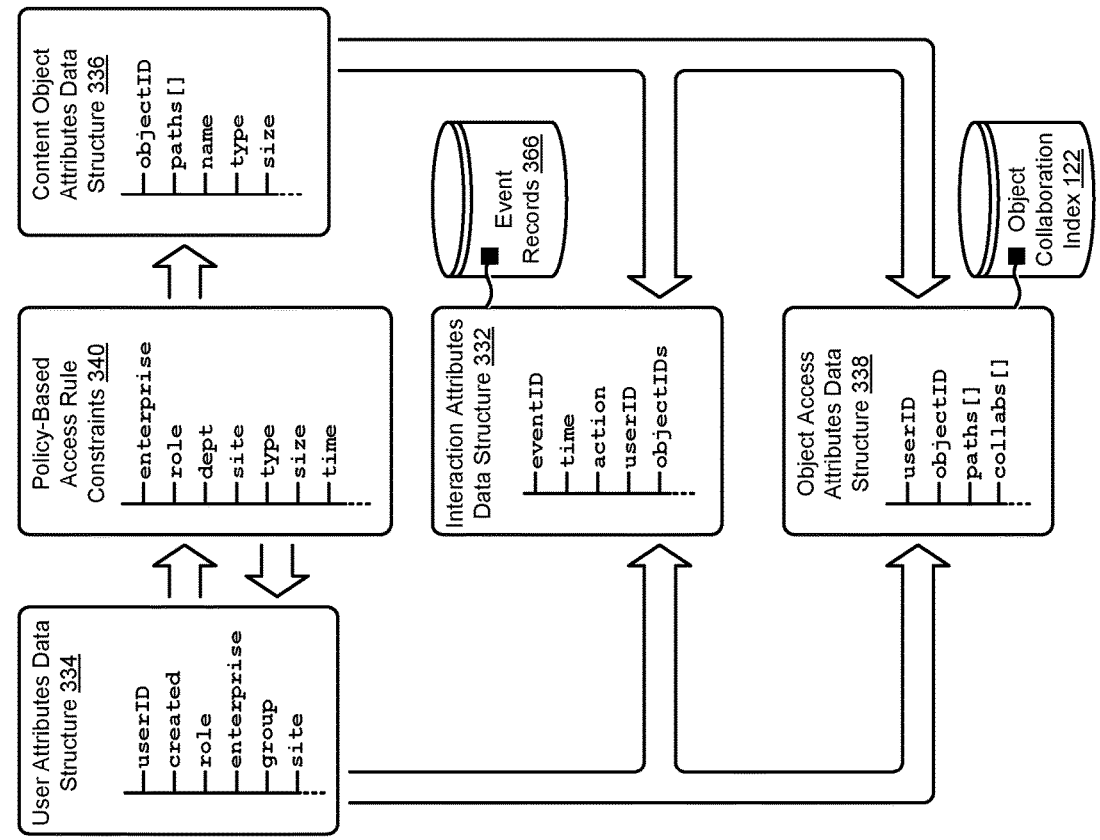
FIG. 3B presents a user interaction event processing technique as implemented in systems that facilitate two-stage generation of collaboration activity listings, according to an embodiment.
Figure 3B:
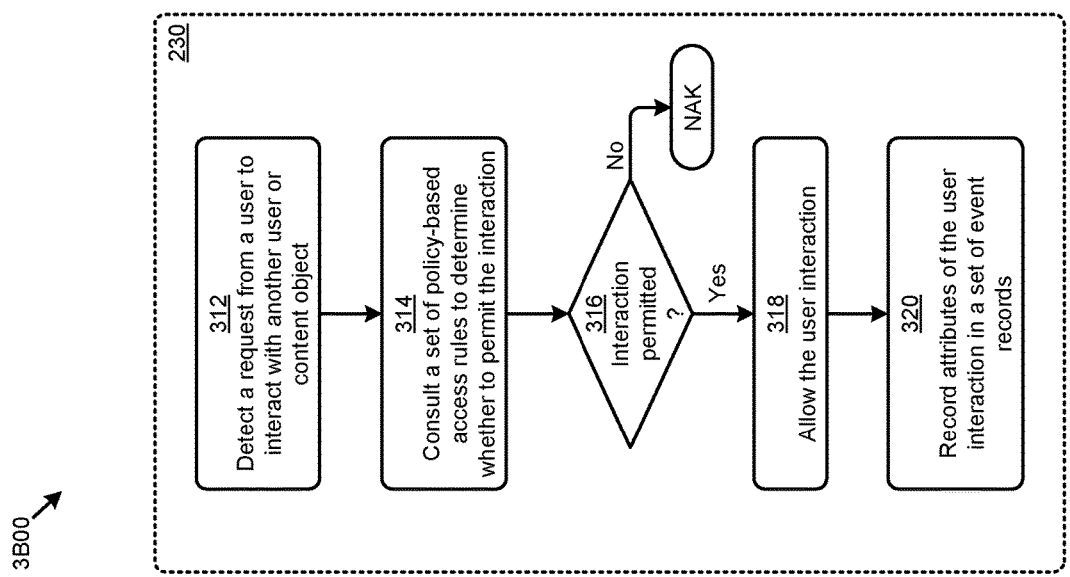

FIG. 3B presents a user interaction event processing technique 3B00 as implemented in systems that facilitate two-stage generation of collaboration activity listings. As an option, one or more variations of user interaction event processing technique 3B00 or any aspect thereof may be implemented in the context of the architecture and functionality of the embodiments described herein. The user interaction event processing technique 3B00 or any aspect thereof may be implemented in any environment.

FIG. 3B illustrates one aspect pertaining to filtering user interaction events in two stages so as to reduce the number of events over which policy-based access permissions are applied when generating user activity listings. Specifically, the figure is being presented to illustrate one embodiment of certain steps and/or operations for processing (e.g., permissions checking, attribute recording, etc.) of user interaction events as implemented according to the herein disclosed techniques. The figure further illustrates one embodiment of the data structures of the data sets (e.g., interaction attributes, object access attributes, policy-based access rules, user attributes, content attributes, etc.) that are accessed and/or populated in conjunction with processing a user interaction event.

The data sets described herein can be organized and/or stored using various techniques. Specifically, the data structures corresponding to the data sets shown in FIG. 3B are designed to improve the way a computer stores and retrieves data in memory when performing steps and/or operations pertaining to two-stage generation of collaboration activity listings.

For example, the data comprising event records 366 might be organized and/or stored in a tabular structure (e.g., relational database table) that has rows that relate various attributes, such as user or collaboration object identifiers, that pertain to a particular user interaction event. As another example, the information might be organized and/or stored in a programming code object that has instances corresponding to a particular user interaction event and properties corresponding to the various attributes associated with the event. In some cases, any of the foregoing data structures might be logically represented in a graph that comprises nodes (e.g., collaboration objects) and edges (e.g., pairwise relationships between the collaboration objects).

As depicted by the interaction attributes data structure 332, a user interaction event data record (e.g., table row or object instance or graph relationship) for a particular user interaction event might describe an event identifier (e.g., stored in an "event ID" field), an event timestamp (e.g., stored in a "time" field), a description of the interaction type (e.g., stored in an "action" field), an identifier associated with the user (e.g., stored in a "userID" field), an identifier associated with the collaboration object (e.g., a user, and/or one or more content objects, etc.) accessed by the user (e.g., stored in an "objectIDs" field), and/or other interaction attributes.

According to the user attributes data structure 334, a user profile data record (e.g., table row or object instance) for a particular user might describe a user identifier (e.g., stored in an "userID" field), a timestamp when the user profile was created (e.g., stored in a "created" field), an identifier associated with the role of the user (e.g., stored in a "role" field), an identifier associated with the enterprise of the user (e.g., stored in an "enterprise" field), an identifier associated with the group (e.g., department) of the user (e.g., stored in a "group" field), an identifier associated with the site corresponding to the user (e.g., stored in a "site" field), and/or other user attributes.

Referring to the content object attributes data structure 336, a set of content object metadata (e.g., table row or object instance) for a particular content object might describe a content object identifier (e.g., stored in an "objectID" field), a list of hierarchical file system paths associated with the content object (e.g., stored in a "paths[ ]" object), a content object name (e.g., stored in a "name" field), an identifier associated with the type of the content object (e.g., stored in a "type" field), an indication of the size of the content object (e.g., stored in a "size" field), and/or other content object attributes.

The object access attributes data structure 338 indicates an entry (e.g., table row or object instance) in the object collaboration index 122 might describe a user identifier (e.g., stored in an "userID" field), a content object identifier (e.g., stored in an "objectID" field), a list of hierarchical file system paths associated with the content object (e.g., stored in a "paths[ ]" object), a list of other users collaborating with the user on the content object (e.g., stored in a "collabs[ ]" object), and/or other object access attributes.

A set of rules (e.g., rule base) such as the policy-based access rules or any other rules described herein, comprises data records storing various information that can be used to form one or more constraints to apply to certain functions and/or operations. For example, the information pertaining to a rule in the rule base might comprise the conditional logic operands (e.g., input variables, conditions, constraints, etc.) and/or operators (e.g., "if", "then", "and", "or", "greater than", "less than", etc.) for forming a conditional logic statement that returns one or more results. As shown in the set of policy-based access rule constraints 340, aspects that might be considered when determining collaboration object access policies include the "enterprise" of a user, the "role" of a user, the "dept" of a user, the "site" of a user, the "type" of content object, the "size" of a content object, the "time" of the permissions request, and/or other aspects.

The foregoing data sets and corresponding structures are used by the user interaction event processing technique 3B00. As shown, the user interaction event processing technique 3B00 includes steps for capturing and storing user interaction events (e.g., step 230 of FIG. 2). Specifically, when a request by a user to interact with another user or a content object is detected (step 312), a set of policy-based access rules are consulted to determine whether the interaction is to be permitted (step 314). As an example, permissions for a user-content interaction would be determined by applying the constraints (e.g., as depicted in policy-based access rule constraints 340) of the policy-based access rules to the user attributes (e.g., as depicted in user attributes data structure 334) of the requesting user and to the content object attributes (e.g., as depicted in content object attributes data structure 336).

If the rules are not satisfied, then the interaction is not permitted (see "No" path of decision 316) and a negative acknowledgement (NAK) or error is returned. If the rules are satisfied, then the interaction is permitted (see "Yes" path of decision 316) and the user interaction is allowed to be performed (step 318). The various attributes characterizing the user interaction are recorded in a set of event records (step 320). In some cases (e.g., when a new object version is created), the various attributes characterizing the user interaction are also stored in an object collaboration index. As illustrated in FIG. 3B, for example, a portion of the user attributes and/or content object attributes associated with the user interaction event are stored in the interaction attributes data structure 332 of the event records 366 as well as in the object access attributes data structure 338 of the object collaboration index 122.

A scenario to further describe the user interaction event processing technique 3B00 is disclosed as follows.

Figure 3C:
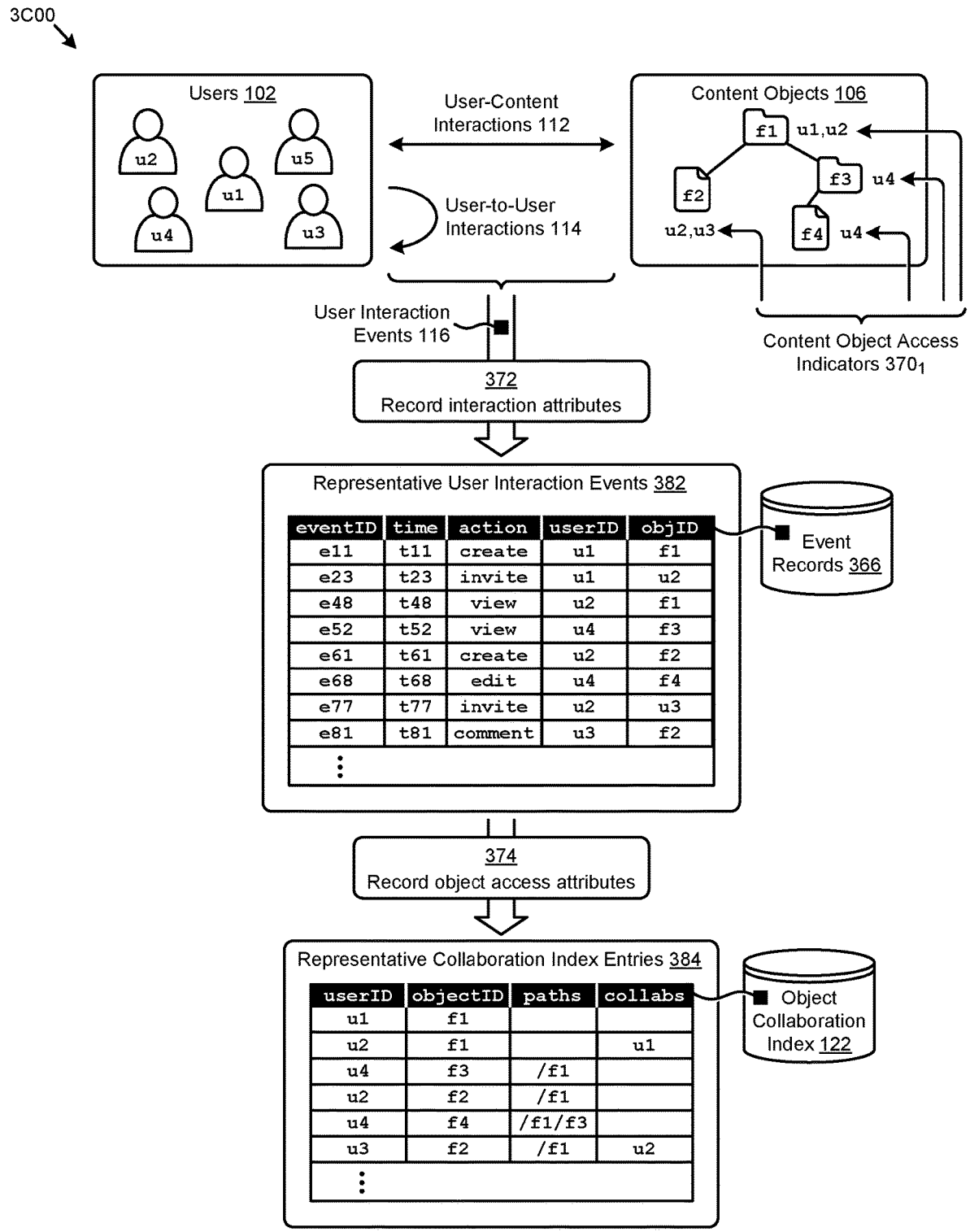
FIG. 3C illustrates a user interaction scenario as facilitated by systems that implement two-stage generation of collaboration activity listings, according to an embodiment.

FIG. 3C illustrates a user interaction scenario 3C00 as facilitated by systems that implement two-stage generation of collaboration activity listings. As an option, one or more variations of user interaction scenario 3C00 or any aspect thereof may be implemented in the context of the architecture and functionality of the embodiments described herein. The user interaction scenario 3C00 or any aspect thereof may be implemented in any environment.

FIG. 3C illustrates one aspect pertaining to filtering user interaction events in two stages so as to reduce the number of events over which policy-based access permissions are applied when generating user activity listings. Specifically, the figure is presented to illustrate a representative example of the data that is captured for a set of user interaction events using the data structures and techniques described herein.

As earlier described, a set of user interaction events 116 can correspond to various interactions (e.g., user-content interactions 112 or user-to-user interactions 114) between a plurality of users 102 (e.g., user "u1", user "u2", user "u3", user "u4", and user "u5") and a plurality of content objects 106 (e.g., folder "/f1", file "f2", folder "/f3", and file "f4"). For each of the user interaction events 116, a set of interaction attributes are recorded (operation 372).

As illustrated in a set of representative user interaction events 382, the interaction attributes can be organized and stored in event records 366 in a data structure such as the interaction attributes data structure 332 discussed as pertains to FIG. 3B. The representative user interaction events 382 include, for example, a user interaction event identified as "e48" that corresponds to a user "u2" viewing (e.g., "action"="view") a content object "f1" at time "t48". A set of object access attributes are also recorded for each of the user interaction events 116 (operation 374). A set of representative collaboration index entries 384 correspond to the object access attributes data structure 338 as shown and discussed as pertains to FIG. 3B. The representative collaboration index entries 384 include, for example, an entry that pertains to a user "u3" with access to a content object "f2" having a parent path "/f1" and a collaborating user "u2". The shown representative collaboration index entries 384 are merely illustrative, and other techniques for organizing object access attributes are possible. As one example, relationships between a user and objects, and/or relationships between a user and paths, etc. can be stored in multiple tables and/or using multi-valued cells of tables. As another example, relationships between a user and objects, and/or relationships between a user and paths, etc. can be stored in relations of a relational database, and the relational database can be queried using a JOIN operation and/or other data manipulation operations.

The data (e.g., tables, relations, etc.) that characterizes a hierarchy of folders and files can be organized such that determining the full hierarchical path of a particular file or object can be performed in constant time. As depicted in the foregoing examples, this can be accomplished by storing the full hierarchical path of an object together with the object (e.g., in the same row of a table).

An indication of the permitted user access as codified in the representative collaboration index entries 384 is depicted by a set of content object access indicators 370₁. The content object access indicators 370₁ show, for example, that folder "/f1" is accessible by user "u1" and user "u2" (e.g., user "u1" shared folder "/f1" with user "u2").

The foregoing discussions include techniques for selecting candidate user-specific events from a set of user interaction events (e.g., step 240 of FIG. 2), which techniques are disclosed in further detail as follows.

Figure 4:
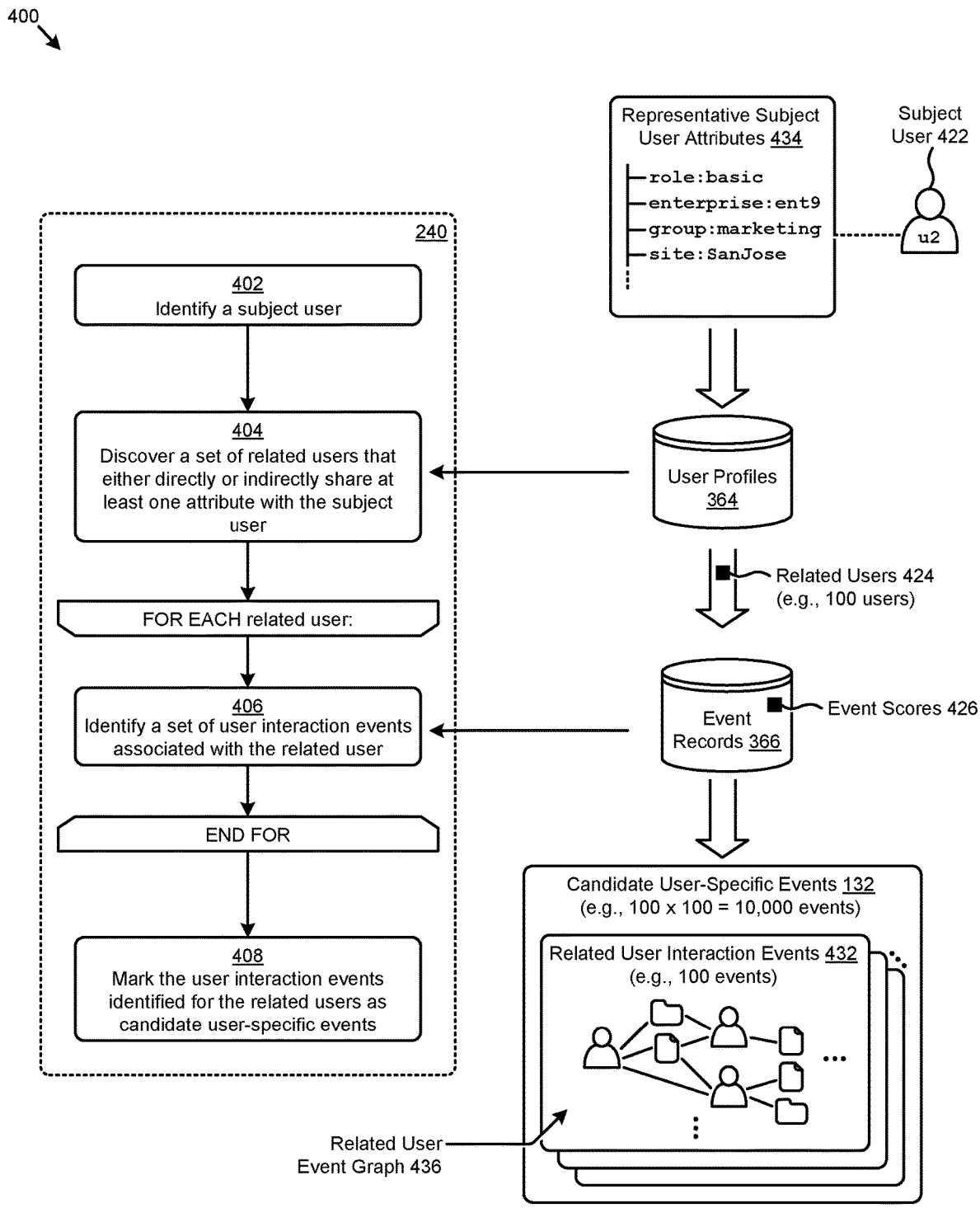
FIG. 4 depicts a candidate user interaction event selection technique as implemented in systems that facilitate two-stage generation of collaboration activity listings, according to an embodiment.

FIG. 4 depicts a candidate user interaction event selection technique 400 as implemented in systems that facilitate two-stage generation of collaboration activity listings. As an option, one or more variations of candidate user interaction event selection technique 400 or any aspect thereof may be implemented in the context of the architecture and functionality of the embodiments described herein. The candidate user interaction event selection technique 400 or any aspect thereof may be implemented in any environment.

FIG. 4 illustrates one aspect pertaining to filtering user interaction events in two stages so as to reduce the number of events over which policy-based access permissions are applied when generating user activity listings. Specifically, the figure is being presented to illustrate one embodiment of certain steps and/or operations for selecting a set of candidate user interaction events that might be used to generate a collaboration activity feed for a particular subject user.

The candidate user interaction event selection technique 400 shown in FIG. 4 can commence by identifying a subject user (step 402). For example, a subject user 422 (e.g., user "u2") having the user attributes shown in representative subject user attributes 434 might be identified. A set of related users that share at least some of the attributes of the subject user are discovered (step 404). As an example, the user profiles 364 might be scanned to identify a set of related users 424 (e.g., 100 users) that have a "basic" user role, work at enterprise "ent9", are members of the "marketing" group, have an office at the "SanJose" site, and/or share any other attribute or combination of attributes with the subject user 422. In some cases, a related user may not share an attribute with the subject user, but may share an attribute with another related user who shares a different attribute with the subject user. Direct user-to-user relationships as well as indirect user-to-user relationships can be used to define a type and a relatedness between users.

For each of the related users, a set of user interaction events associated with the related user is identified (step 406). As can be observed, for example, the event records 366 might be consulted to identify the 100 most recently invoked user interaction events by the related user. In some cases, the user interaction events pertaining to the related users may be selected based at least in part on scores (e.g., event scores 426) assigned to the user interaction events. The user interaction events identified for the related users are then marked as candidate user-specific events corresponding to the subject user (step 408). The candidate user-specific events 132 (e.g., 100×100=10,000 events) are shown in FIG. 4 as comprising multiple instances (e.g., for each of 100 related users) of related user interaction events 432 (e.g., 100 events). For reference, the related user interaction events are visually represented by a related user event graph 436 that comprises nodes (e.g., collaboration objects) and edges (e.g., pairwise relationships between the collaboration objects).

Further details regarding general approaches to forming and storing event scores are described in U.S. application Ser. No. 16/051,442, filed on Jul. 31, 2018, titled "FORMING EVENT-BASED RECOMMENDATIONS", which is hereby incorporated by reference in its entirety.

The foregoing discussions include techniques for filtering candidate user-specific events based at least in part on object access attributes from an object collaboration index (e.g., step 250 of FIG. 2), which techniques are disclosed in further detail as follows.

Figure 5:
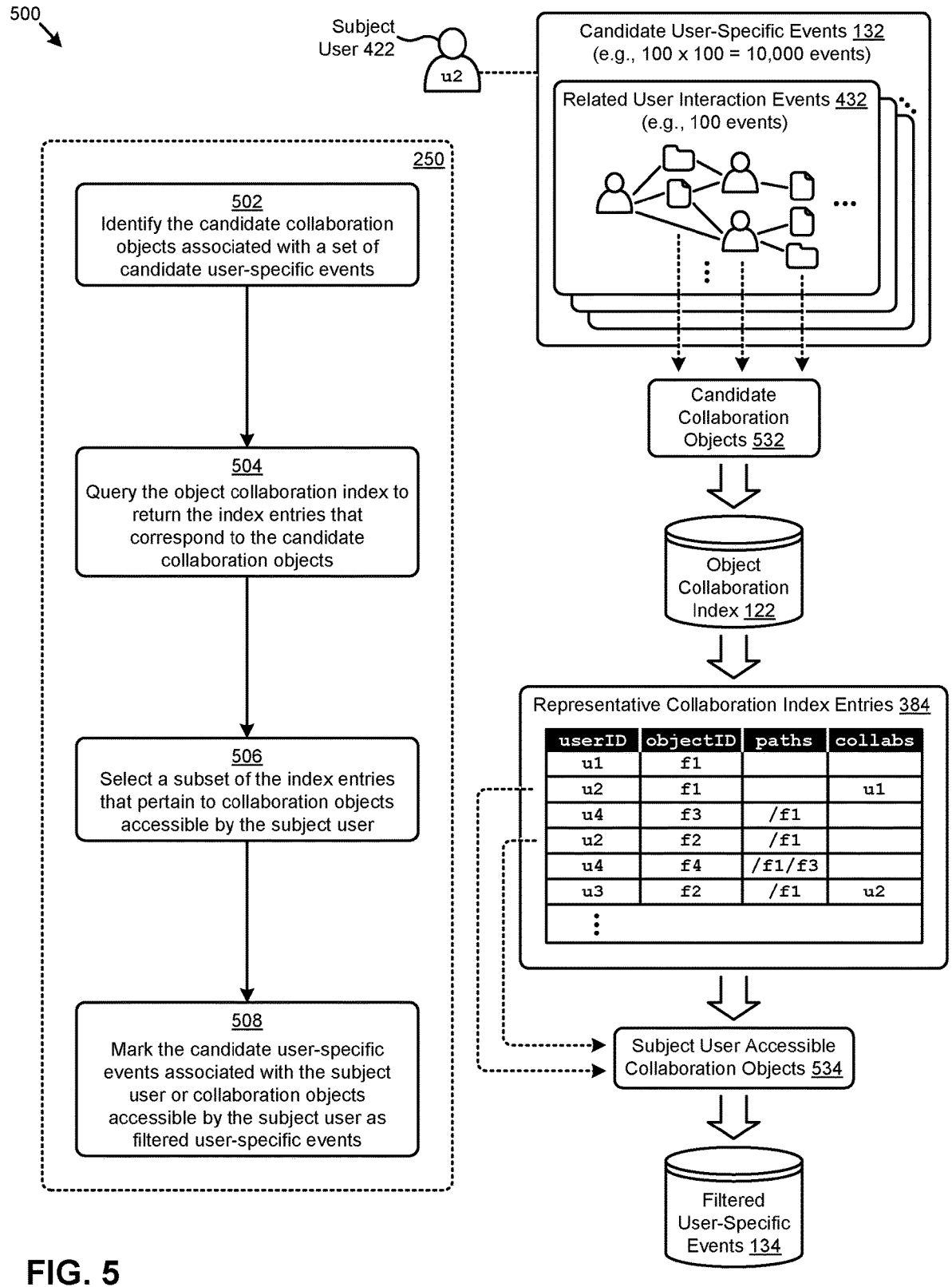
FIG. 5 presents an index-based event filtering technique as implemented in systems that facilitate two-stage generation of collaboration activity listings, according to an embodiment.

FIG. 5 presents an index-based event filtering technique 500 as implemented in systems that facilitate two-stage generation of collaboration activity listings. As an option, one or more variations of index-based event filtering technique 500 or any aspect thereof may be implemented in the context of the architecture and functionality of the embodiments described herein. The index-based event filtering technique 500 or any aspect thereof may be implemented in any environment.

FIG. 5 illustrates one aspect pertaining to filtering user interaction events in two stages so as to reduce the number of events over which policy-based access permissions are applied when generating user activity listings. Specifically, the figure is presented to illustrate one embodiment of certain steps and/or operations for performing the first stage of filtering a set of candidate user interaction events. The first stage of filtering uses an object collaboration index to facilitate low latency data manipulation (e.g., filtering) operations.

The index-based event filtering technique 500 can commence by identifying the collaboration objects associated with a set of candidate user-specific events (step 502). As illustrated in FIG. 5, a set of candidate collaboration objects 532 (e.g., users, content objects, etc.) can be identified from the event graph nodes of the related user interactions events 432 that constitute the candidate user-specific events 132 pertaining to a subject user 422 (e.g., user "u2"). An object collaboration index 122 is queried to return the index entries that correspond to the candidate collaboration objects (step 504).

For example, the object collaboration index 122 might be queried to return the representative collaboration index entries 384. A subset of the index entries that pertain to collaboration objects accessible by the subject user are selected (step 506). As shown, a set of subject user accessible collaboration objects 534 selected from the representative collaboration index entries 384 might include folder "/f1" and file "f2", since the subject user 422 (e.g., user "u2") is recorded as having access at some moment in time to each of those content objects. In some cases, permissions on files or other objects in a folder are inherited from the containing folder. As such, if a user (e.g., user "u2") has permissions to interact with folder "/f1", and if the folder permissions are inherited, then that user (e.g., user "u2") also has permissions to interact with file "f1". This is shown in the second row of representative collaboration index entries 384. In other scenarios however, permissions on objects in folders are not automatically inherited from the containing folder, and/or permissions on objects in folders can be over-ridden even when folder permissions are initially inherited by objects in the containing folder. Application of the foregoing serves to generate index entries that pertain to collaboration objects that are accessible by the subject user. As such, a set of candidate user-specific events that correspond to subject user accessible collaboration objects 534, are marked (step 508). The performance of step 508 and/or other operations pertaining to the candidate user-specific events are stored, as shown, as filtered user-specific events 134. The filtered user-specific events 134 are operated on to apply policy-based access rules to those filtered user-specific events to identify a set of policy-tested user-specific events (e.g., step 260 of FIG. 2). One technique for applying policy-based access rules to filtered user-specific events is disclosed as follows.

Figure 6:
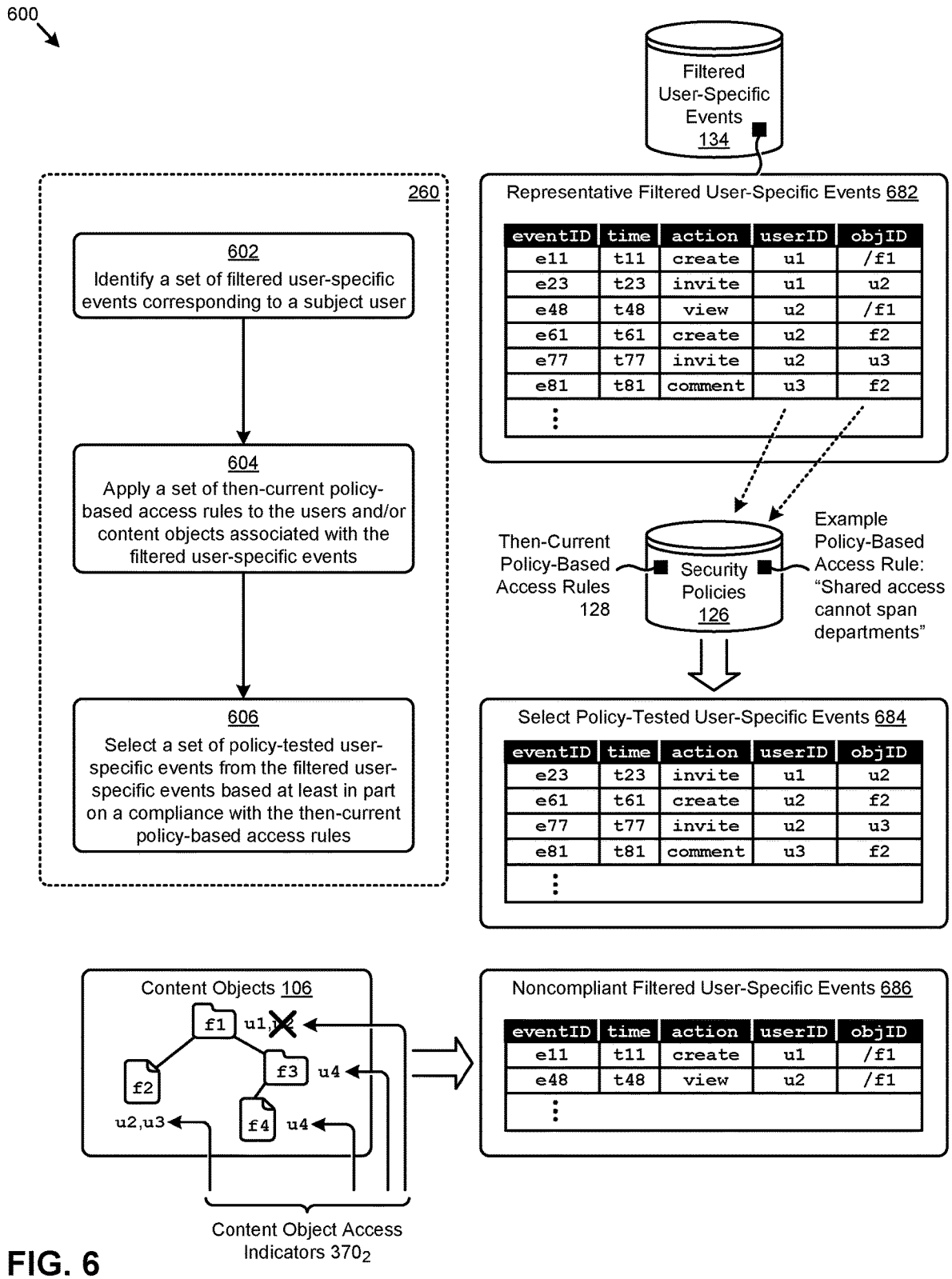
FIG. 6 presents a policy-based event filtering technique as implemented in systems that facilitate two-stage generation of collaboration activity listings, according to an embodiment.

FIG. 6 presents a policy-based event filtering technique 600 as implemented in systems that facilitate two-stage generation of collaboration activity listings. As an option, one or more variations of policy-based event filtering technique 600 or any aspect thereof may be implemented in the context of the architecture and functionality of the embodiments described herein. The policy-based event filtering technique 600 or any aspect thereof may be implemented in any environment.

FIG. 6 illustrates one aspect pertaining to filtering user interaction events in two stages so as to reduce the number of events over which policy-based access permissions are applied when generating user activity listings. Specifically, the figure is presented to illustrate one embodiment of certain steps and/or operations for performing the second stage of filtering of a set of candidate user interaction events. The second stage of filtering applies a complex permissions model to the user interaction events to determine whether a subject user can access the underlying collaboration objects associated with the events.

The policy-based event filtering technique 600 shown in FIG. 6 can commence by identifying a set of filtered user-specific events corresponding to a subject user (step 602). Filtered user-specific events selected according to the herein disclosed techniques are events associate with collaboration objects to which the subject user was provisioned access at least once at some earlier moment in time. A set of representative filtered user-specific events 682 from the filtered user-specific events 134 is shown. A set of then-current policy-based access rules are applied to the users and/or collaboration objects associated with the filtered user-specific events (step 604). As shown, the then-current policy-based access rules 128 derived from the security policies 126 are applied to the users (e.g., identified in the "userID" field) and/or collaboration objects (e.g., identified in the "objID" field) of the representative filtered user-specific events 682.

A set of policy-tested user-specific events are selected from the filtered user-specific events 134 based at least in part on a compliance with the then-current policy-based access rules (step 606). As can be observed in the example of FIG. 6, four of the six events depicted in the representative filtered user-specific events 682 are included in a set of select policy-tested user-specific events 684, while two events (e.g., noncompliant filtered user-specific events 686) from the representative filtered user-specific events 682 are excluded from the select policy-tested user-specific events 684.

As illustrated in a set of content object access indicators 3702 associated with content objects 106, the noncompliant filtered user-specific events 686 might be excluded from the select policy-tested user-specific events 684 as a result of one or more changes in the computing environment that eliminated access to folder "/f1" by user "u2". Such changes may be related to any of the entities (e.g., users, content objects, security policies, etc.) of a particular computing environment. As examples, access to folder "/f1" by user "u2" may have been removed in response to user "u1" no longer sharing folder "/f1" with user "u2", or in response to user "u2" moving to a different group such as given in the example policy-based access rule: "Shared access cannot span departments". As still another example, access to folder "/f1" by user "u2" may have been removed in response to user "u1" establishing a privacy or sensitivity setting on folder "/f1". Privacy settings and/or sensitivity setting can be established on a user-specific basis. Moreover, rules or logic related to privacy settings and/or sensitivity setting can be established on a user-specific basis.

The foregoing discussions include techniques for generating and presenting user-specific activity feed entries from the policy-tested user-specific events (e.g., step 270 of FIG. 2), which techniques are disclosed in further detail as follows.

Figure 7:
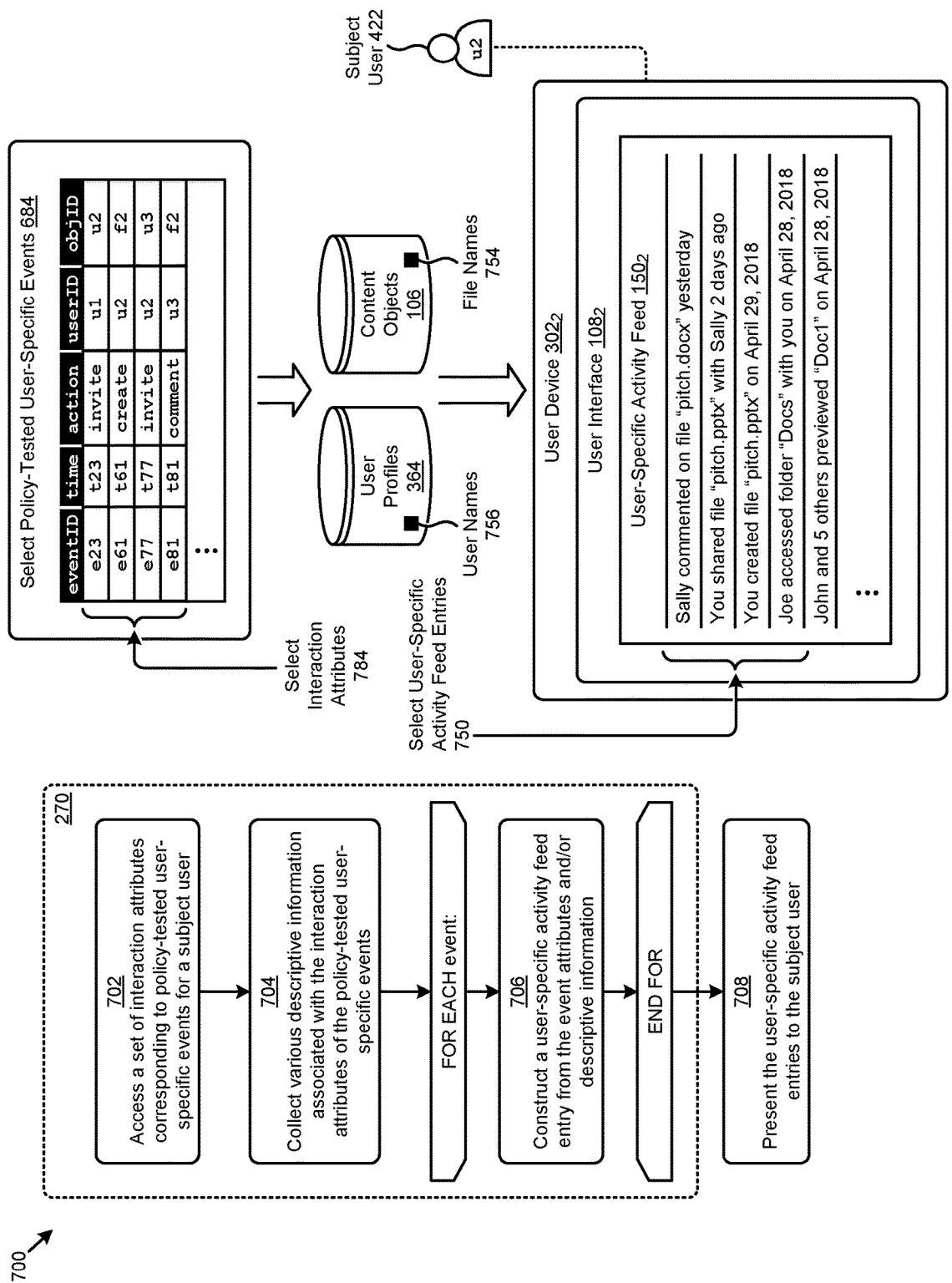
FIG. 7 illustrates an activity feed presentation technique as implemented in systems that facilitate two-stage generation of collaboration activity listings, according to an embodiment.

FIG. 7 illustrates an activity feed presentation technique 700 as implemented in systems that facilitate two-stage generation of collaboration activity listings. As an option, one or more variations of activity feed presentation technique 700 or any aspect thereof may be implemented in the context of the architecture and functionality of the embodiments described herein. The activity feed presentation technique 700 or any aspect thereof may be implemented in any environment.

FIG. 7 illustrates one aspect pertaining to filtering user interaction events in two stages so as to reduce the number of events over which policy-based access permissions are applied when generating user activity listings. Specifically, the figure is presented to illustrate one embodiment of certain steps and/or operations for generating human-readable activity feed entries that are presented in a user-specific collaboration activity feed for a particular subject user. Presentation of a feed as constructed and populated using the herein-disclosed techniques is particularly useful to users in enterprise settings. Specifically, feeds as constructed and populated using the herein-disclosed techniques do not include entries that refer to content objects that the subject user cannot access, thus eliminating false "hits". Also, feeds as constructed and populated using the herein-disclosed techniques do not include entries that would violate changing enterprise policies, some of which policies can change more frequently than the file system and/or index permissions change.

The activity feed presentation technique 700 shown in FIG. 7 can commence by accessing a set of interaction attributes corresponding to policy-tested user-specific events associated with a subject user (step 702). As illustrated, a set of select interaction attributes 784 might be accessed for an example set of select policy-tested user-specific events 684. Various descriptive information pertaining to the interaction attributes (e.g., select interaction attributes 784) of the policy-tested user-specific events are collected (step 704). As an example, a set of file names 754 corresponding to any content objects 106 identified in the policy-tested user-specific events might be collected from a storage facility (e.g., content objects 106) that stores the content objects. Furthermore, a set of user names 756 might be collected from the user profiles 364 of any users associated with the policy-tested user-specific events.

For each user interaction event from the policy-tested user-specific events, a user-specific activity feed entry is constructed from the interaction attributes and/or description information associated with the event (step 706). As illustrated in a set of select user-specific activity feed entries 750 for a subject user 422 (e.g., user "u2"), the constructed feed entries comprise human-readable messages derived from the underlying user interaction event information. In some cases, certain message construction logic and/or rules (e.g., for determining verb tense, preposition type and placement, date, formatting, etc.) might be implemented to generate the activity feed entries. The user-specific activity feed entries are then presented to the subject user (step 708). As can be observed, the select user-specific activity feed entries 750 are presented to subject user 422 in a user-specific activity feed 1502 rendered in a user interface 1082 at a user device 3022 associated with subject user 422.

In some cases, the user-specific activity feed entries are processed before being presented. Such processing might include operations pertaining to sorting, decorating, summarizing and/or other operations. Strictly as one example, a user-specific activity feed entry can characterize a group of related events into a single summary entry. As shown, in user-specific activity feed 1502, a summary entry is a description of many related events. In this example, an activity feed entry such as "John and 5 others previewed Doc1 on Apr. 28, 2018", summarizes the users involved (e.g., "John and 5 others"), as well as the summarized action (e.g., "previewed"), as well as the date of the actions (e.g., "Apr. 28, 2018").

Additional Embodiments of the Disclosure

Additional Practical Application Examples

Figure 8:
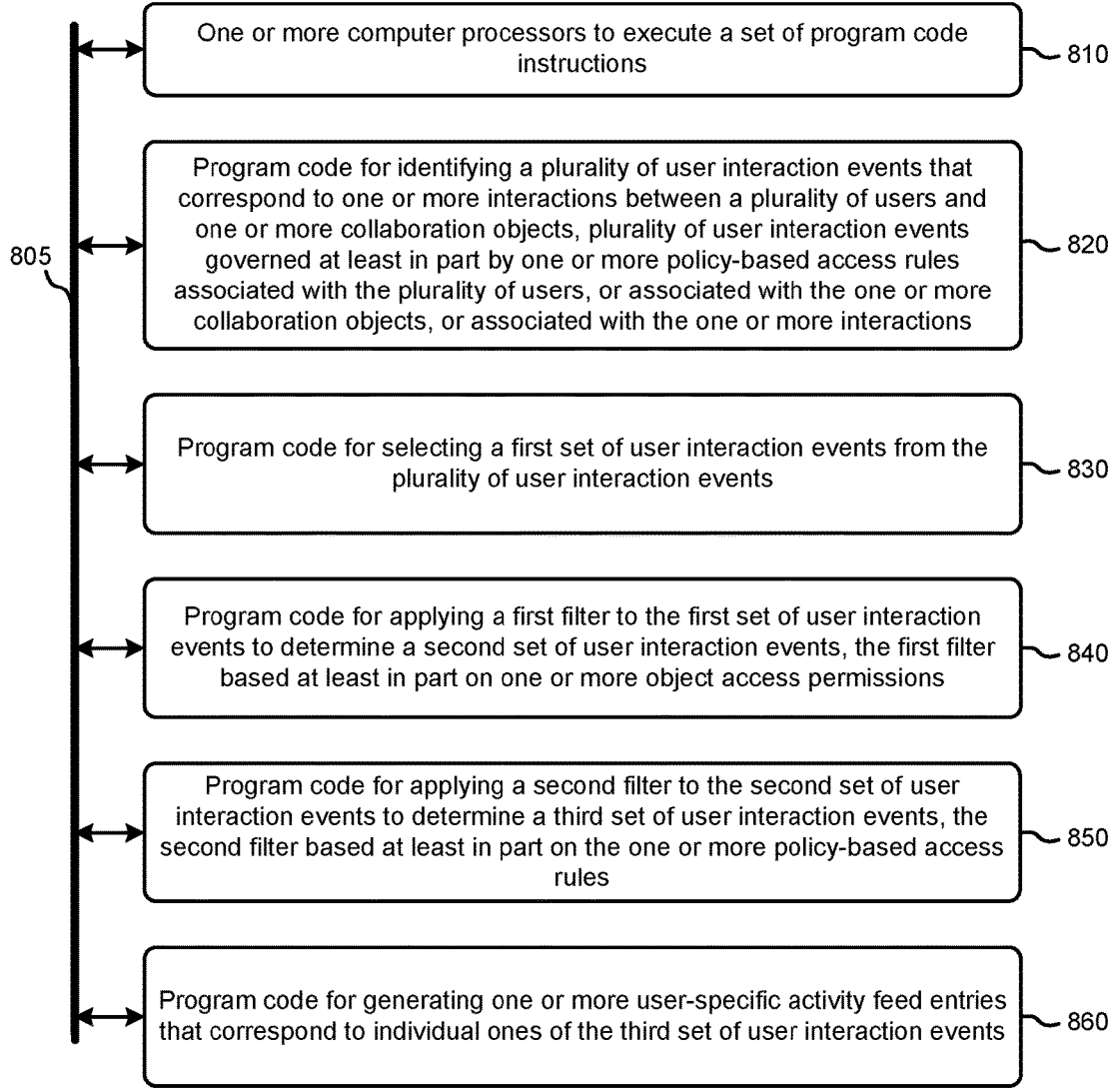
FIG. 8 depicts system components as arrangements of computing modules that are interconnected so as to implement certain of the herein-disclosed embodiments.

FIG. 8 depicts a system 800 as an arrangement of computing modules that are interconnected so as to operate cooperatively to implement certain of the herein-disclosed embodiments. This and other embodiments present particular arrangements of elements that, individually and/or as combined, serve to form improved technological processes that address unacceptably high usage of computing resources when presenting collaboration activities to users in highly active environments. The partitioning of system 800 is merely illustrative and other partitions are possible. As an option, the system 800 may be implemented in the context of the architecture and functionality of the embodiments described herein. Of course, however, the system 800 or any operation therein may be carried out in any desired environment.

The system 800 comprises at least one processor and at least one memory, the memory serving to store program instructions corresponding to the operations of the system. As shown, an operation can be implemented in whole or in part using program instructions accessible by a module. The modules are connected to a communication path 805, and any operation can communicate with other operations over communication path 805. The modules of the system can, individually or in combination, perform method operations within system 800. Any operations performed within system 800 may be performed in any order unless as may be specified in the claims.

The shown embodiment implements a portion of a computer system, presented as system 800, comprising one or more computer processors to execute a set of program code instructions (module 810) and modules for accessing memory to hold program code instructions to perform: identifying a plurality of user interaction events that correspond to one or more interactions between a plurality of users and one or more collaboration objects, the plurality of user interaction events governed at least in part by one or more policy-based access rules associated with the plurality of users, and/or associated with the one or more collaboration objects, and/or associated with the one or more interactions (module 820); selecting a first set of user interaction events from the plurality of user interaction events (module 830); applying a first filter to the first set of user interaction events to determine a second set of user interaction events, the first filter based at least in part on one or more object access permissions (module 840); applying a second filter to the second set of user interaction events to determine a third set of user interaction events, the second filter based at least in part on the one or more policy-based access rules (module 850); and generating one or more user-specific activity feed entries that correspond to individual ones of the third set of user interaction events (module 860).

Variations of the foregoing may include more or fewer of the shown modules. Certain variations may perform more or fewer (or different) steps and/or certain variations may use data elements in more or in fewer (or different) operations. For example, in exemplary variations, the third set of user interaction events is a subset of the second set of user interaction events. Some embodiments perform processing wherein the subset of the second set of user interaction events is based at least in part on one or more differences between a first state of a computing environment and a second state of the computing environment. In some embodiments, the first set of user interaction events is selected based at least in part on one or more user attributes associated with a subject user, and/or where the one or more collaboration objects comprises at least one of, one or more of the plurality of users, or one or more content objects.

Some embodiments further comprise executing steps that perform data manipulation operations over an object collaboration index that stores the one or more object access permissions, and then determining the second set of user interaction events based at least in part on one or more results produced by the one or more data manipulation operations.

Many exemplary embodiments further comprise presenting one or more user-specific activity feed entries to a subject user in an activity feed of a user interface. Still further, some embodiments include variations in the order that operations performed, and some embodiments include variations of aspects of the data elements used when performing the operations.

System Architecture Overview

Additional System Architecture Examples

Figure 9A:
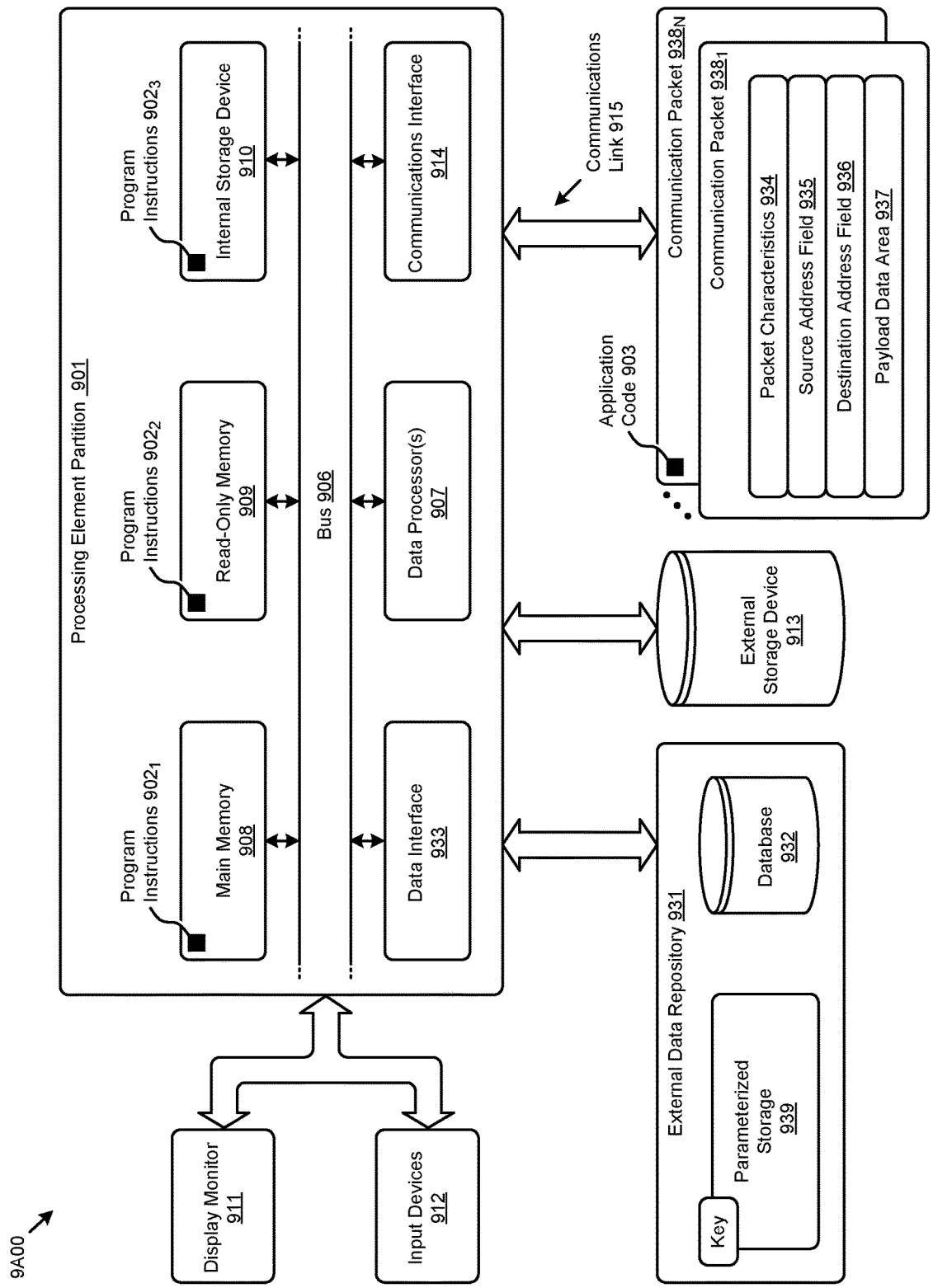
FIG. 9A and FIG. 9B present block diagrams of computer system architectures having components suitable for implementing embodiments of the present disclosure, and/or for use in the herein-described environments.

FIG. 9A depicts a block diagram of an instance of a computer system 9A00 suitable for implementing embodiments of the present disclosure. Computer system 9A00 includes a bus 906 or other communication mechanism for communicating information. The bus interconnects subsystems and devices such as a central processing unit (CPU), or a multi-core CPU (e.g., data processor 907), a system memory (e.g., main memory 908, or an area of random access memory (RAM)), a non-volatile storage device or non-volatile storage area (e.g., read-only memory 909), an internal storage device 910 or external storage device 913 (e.g., magnetic or optical), a data interface 933, a communications interface 914 (e.g., PHY, MAC, Ethernet interface, modem, etc.). The aforementioned components are shown within processing element partition 901, however other partitions are possible. Computer system 9A00 further comprises a display 911 (e.g., CRT or LCD), various input devices 912 (e.g., keyboard, cursor control), and an external data repository 931.

According to an embodiment of the disclosure, computer system 9A00 performs specific operations by data processor 907 executing one or more sequences of one or more program code instructions contained in a memory. Such instructions (e.g., program instructions 9021, program instructions 9022, program instructions 9023, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 9A00 performs specific networking operations using one or more instances of communications interface 914. Instances of communications interface 914 may comprise one or more networking ports that are configurable (e.g., pertaining to speed, protocol, physical layer characteristics, media access characteristics, etc.) and any particular instance of communications interface 914 or port thereto can be configured differently from any other particular instance. Portions of a communication protocol can be carried out in whole or in part by any instance of communications interface 914, and data (e.g., packets, data structures, bit fields, etc.) can be positioned in storage locations within communications interface 914, or within system memory, and such data can be accessed (e.g., using random access addressing, or using direct memory access DMA, etc.) by devices such as data processor 907.

Communications link 915 can be configured to transmit (e.g., send, receive, signal, etc.) any types of communications packets (e.g., communication packet $938_1$, communication packet $938_N$) comprising any organization of data items. The data items can comprise a payload data area 937, a destination address 936 (e.g., a destination IP address), a source address 935 (e.g., a source IP address), and can include various encodings or formatting of bit fields to populate packet characteristics 934. In some cases, the packet characteristics include a version identifier, a packet or payload length, a traffic class, a flow label, etc. In some cases, payload data area 937 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 907 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 931, which in turn can be formatted into any one or more storage areas, and which can comprise parameterized storage 939 accessible by a key (e.g., filename, table name, block address, offset address, etc.).

Execution of the sequences of instructions to practice certain embodiments of the disclosure are performed by a single instance of a computer system 9A00. According to certain embodiments of the disclosure, two or more instances of computer system 9A00 coupled by a communications link 915 (e.g., LAN, public switched telephone network, or wireless network) may perform the sequence of instructions required to practice embodiments of the disclosure using two or more instances of components of computer system 9A00.

Computer system 9A00 may transmit and receive messages such as data and/or instructions organized into a data structure (e.g., communications packets). The data structure can include program instructions (e.g., application code 903), communicated through communications link 915 and communications interface 914. Received program code may be executed by data processor 907 as it is received and/or stored in the shown storage device or in or upon any other non-volatile storage for later execution. Computer system 9A00 may communicate through a data interface 933 to a database 932 on an external data repository 931. Data items in a database can be accessed using a primary key (e.g., a relational database primary key).

Processing element partition 901 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 907. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to two-stage generation of collaboration activity listings. A module may include one or more state machines and/or combinational logic used to implement or facilitate the operational and/or performance characteristics pertaining to two-stage generation of collaboration activity listings.

Various implementations of database 932 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of two-stage generation of collaboration activity listings). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to two-stage generation of collaboration activity listings, and/or for improving the way data is manipulated when performing computerized operations pertaining to filtering user interaction events in two stages so as to reduce the number of events over which policy-based access permissions are applied when generating user activity listings.

Figure 9B:
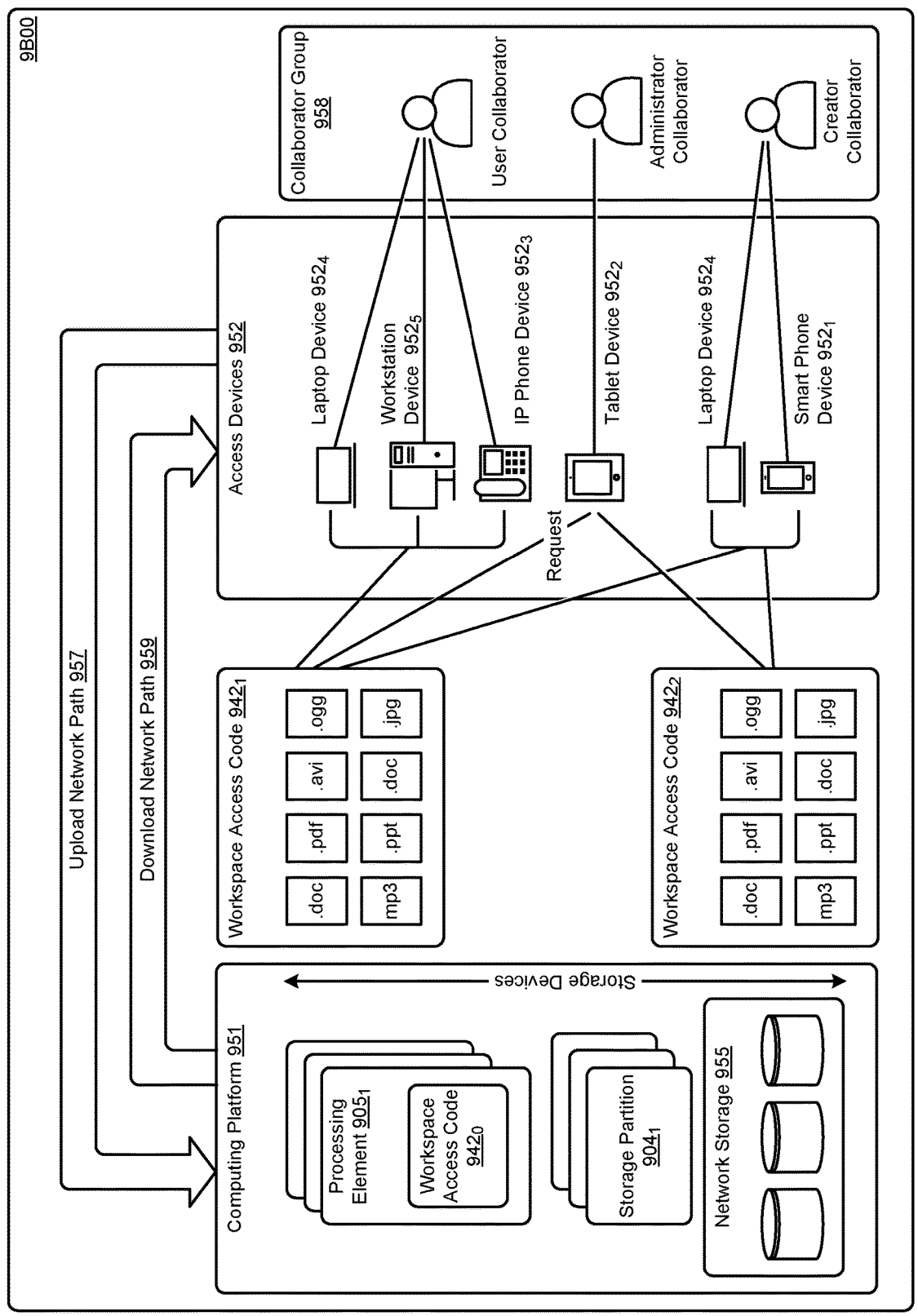

FIG. 9B depicts a block diagram of an instance of a cloud-based environment 9B00. Such a cloud-based environment supports access to workspaces through the execution of workspace access code (e.g., workspace access code $942_0$, workspace access code $942_1$, and workspace access code $942_2$). Workspace access code can be executed on any of access devices 952 (e.g., laptop device $952_4$, workstation device $952_5$, IP phone device $952_3$, tablet device $952_2$, smart phone device $952_1$, etc.). A group of users can form a collaborator group 958, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 951, including in a middleware setting. As shown, a portion of the workspace access code resides in and can be executed on one or more processing elements (e.g., processing element $905_1$). The workspace access code can interface with storage devices such as networked storage 955. Storage of workspaces and/or any constituent files or objects, and/or any other code or scripts or data can be stored in any one or more storage partitions (e.g., storage partition $904_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 957). A stored workspace can be delivered to a particular user and/or shared with other particular users via a download (e.g., a download from a processing element to an access device over a download network path 959).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for filtering collaboration activity to present in a user interface, the method performed by at least one computer and comprising:
   Identifying a set of user interaction events that corresponds to one or more interactions that multiple users collaborate on multiple collaboration objects, wherein at least some of the first set user interaction events are subject to one or more policy-based access rules;
   determining a reduced set of user interaction events from the set of user interaction events for a specific user using a multi-stage filtering, the multi-stage filtering comprising:
      applying one or more object or user access permissions at a first filtering stage to reduce the set of user interaction events into a first reduced set of user interaction events, wherein a first application of filtering for the one or more object or user access permissions identifies, into the first reduced set, multiple first user interaction events pertaining to multiple collaboration objects which the specific user is permitted to collaborate on and filters out remaining user interaction events from the set of user interaction events; and
      determining the reduced set of user interaction events at least by applying the one or more policy-based access rules at a second filtering stage following the first filtering stage to reduce the first reduced set of user interaction events into the reduced set of user interaction events wherein a second application of filtering for the one or more policy-based access rules filters out, from the first reduced set of user interaction events, user interaction events pertaining to at least one collaboration object of the multiple collaboration objects on which the specific user is permitted to collaborate according to the one or more object or user access permissions; and
   generating, in a user interface to the specific user, one or more user-specific activity entries that correspond to one or more user interaction events of the reduced set of user interaction events.

2. The method of claim 1, wherein the reduced set of user interaction events is a subset of the first reduced set of user interaction events, and the one or more policy-based access rules supersede the one or more object or user access permissions.

3. The method of claim 1, wherein the first filtering stage comprises applying a first filter to the set of user interaction events by looking up one or more object access attributes of the multiple collaboration objects for the specific user, wherein an object access attribute of a collaboration object indicates whether the specific user is permitted to access or collaborate on the collaboration object.

4. The method of claim 1, wherein the second filtering stage comprises determining a difference between a first state of a computing environment during a first time period or at a first time point and a second state of the computing environment during a second time period or at a second time point pertaining to the reduced set of user interaction events that does not comply with the one or more policy-based access rules.

5. The method of claim 1, further comprising:
   executing one or more data manipulation operations over an object collaboration index that stores the one or more object or user access permissions.

6. The method of claim 5, further comprising:
   determining the first reduced set of user interaction events based at least in part on one or more results produced by the one or more data manipulation operations, wherein the one or more data manipulation operations comprise or a database table JOIN operation that operates on a relational database that stores at least one relationship between a permissible collaboration object and the specific user.

7. The method of claim 6, further comprising reducing latency of execution of the one or more data manipulation operations by using at least the object collaboration index, wherein the one or more data manipulation operations executed over the object collaboration index are characterized as having a low latency.

8. The method of claim 6, further comprising presenting one or more user-specific activity feed entries to the specific user at least by processing at least some of the reduced set of user interaction events in a presentation layer, wherein the one or more user-specific activity feed entries are actionable and are generated based at least in part on one or more interaction attributes of the second or the reduced set of user interaction events.

9. The method of claim 1, further comprising:
presenting one or more user-specific activity feed entries to the specific user in an activity feed of the user interface, wherein the one or more user-specific activity feed entries are actionable by the specific user, and a user-specific activity entry of the one or more user-specific activity feed entries includes a fact or a representation of the fact that pertains to semantics underlying the user-specific activity feed entry.

10. The method of claim 9, further comprising:
presenting at least one summary entry in the activity feed of the user interface; and
generating or updating an access attribute data structure with the one or more user-specific activity feed entries, wherein
the access attribute data structure comprises an entry that pertains to an identification of the specific user, information about the specific user's access to at least one collaboration object of the multiple collaboration objects, parent information of the at least one collaboration object, and collaborating user information of one or more other users that collaborate on at least one of the multiple collaboration objects with the specific user.

11. A non-transitory computer readable medium having stored thereon a sequence of instructions which, when stored in memory and executed by one or more processors causes the one or more processors to perform a set of acts for filtering collaboration activity to present in a user interface, the set of acts comprising:
identifying a set of user interaction events that corresponds to one or more interactions that multiple users collaborate on multiple collaboration objects, wherein at least some of the first set user interaction events are subject to one or more policy-based access rules;
determining a reduced set of user interaction events from the set of user interaction events for a specific user using a multi-stage filtering, the multi-stage filtering comprising:
applying one or more object or user access permissions at a first filtering stage to reduce the set of user interaction events into a first reduced set of user interaction events, wherein a first application of filtering for the one or more object or user access permissions identifies, into the first reduced set, multiple first user interaction events pertaining to multiple one or more multiple collaboration objects which the specific user is permitted to collaborate on and filters out remaining user interaction events from the set of user interaction events; and
determining the reduced set of user interaction events at least by applying the one or more policy-based access rules at a second filtering stage following the first filtering stage to reduce the first reduced set of user interaction events to determine the reduced set of user interaction events, wherein a second application of filtering for the one or more policy-based access rules filters out, from the first reduced set of user interaction events, user interaction events pertaining to at least one collaboration object of the multiple collaboration objects on which the specific user is permitted to collaborate according to the one or more object or user access permissions; and
generating, in a user interface to the specific user, one or more user-specific activity entries that correspond to one or more user interaction events of the reduced set of user interaction events.

12. The computer readable medium of claim 11, wherein the reduced set of user interaction events is a subset of the first reduced set of user interaction events, and the one or more policy-based access rules supersede the one or more object or user access permissions.

13. The computer readable medium of claim 11, wherein the first filtering stage comprises applying a first filter to the set of user interaction events by looking up one or more object access attributes of the multiple collaboration objects for the specific user, wherein an object access attribute of a collaboration object indicates whether the specific user is permitted to access or collaborate on the collaboration object.

14. The computer readable medium of claim 11, wherein the second filtering stage comprises determining a difference between a first state of a computing environment during a first time period or at a first time point and a second state of the computing environment during a second time period or at a second time point pertaining to the reduced set of user interaction events that does not comply with the one or more policy-based access rules.

15. The computer readable medium of claim 11, further comprising instructions which, when stored in memory and executed by the one or more processors causes the one or more processors to perform acts of:
executing one or more data manipulation operations over an object collaboration index that stores the one or more object or user access permissions.

16. The computer readable medium of claim 15, further comprising instructions which, when stored in memory and executed by the one or more processors causes the one or more processors to perform acts of:
determining the first reduced set of user interaction events based at least in part on one or more results produced by the one or more data manipulation operations, wherein the one or more data manipulation operations comprise at least one of a lookup operation, a query operation, or a database table JOIN operation.

17. The computer readable medium of claim 16, the set of acts further comprising reducing latency of execution of the one or more data manipulation operations by using at least the object collaboration index, wherein the one or more data manipulation operations executed over the object collaboration index are characterized as having a low latency.

18. The computer readable medium of claim 16, the set of acts further comprising presenting one or more user-specific activity feed entries to the specific user at least by processing at least some of the reduced set of user interaction events in a presentation layer, wherein the one or more user-specific activity feed entries are actionable and are generated based at least in part on the one or more interaction attributes of the second or the reduced set of user interaction events.

19. A system for filtering collaboration activity to present in a user interface, the system performed by at least one computer and comprising:
a non-transitory storage medium having stored thereon a sequence of instructions; and
one or more processors that execute the sequence of instructions, execution of the sequence of instruction causing the one or more processors to perform a set of acts, the set of acts comprising,
identifying a set of user interaction events that corresponds to one or more interactions that multiple users collaborate on multiple collaboration objects, wherein at least some of the first set user interaction events are subject to one or more policy-based access rules;
determining a reduced set of user interaction events from the set of user interaction events for a specific user using a multi-stage filtering, the multi-stage filtering comprising:
applying one or more object or user access permissions at a first filtering stage to reduce the set of user interaction events into a first reduced set of user interaction events, wherein a first application of filtering for the one or more object or user access permissions identifies, into the first reduced set, multiple first user interaction events pertaining to multiple collaboration objects which the specific user is permitted to collaborate on and filters out remaining user interaction events from the set of user interaction events; and
determining the reduced set of user interaction events at least by applying the one or more policy-based access rules at a second filtering stage following the first filtering stage to reduce the first reduced set of user interaction events into the reduced set of user interaction events wherein a second application of filtering for the one or more policy-based access rules filters out, from the first reduced set of user interaction events, user interaction events pertaining to at least one collaboration object of the multiple collaboration objects on which the specific user is permitted to collaborate according to the one or more object or user access permissions; and
generating, in a user interface to the specific user, one or more user-specific activity entries that correspond to one or more user interaction events of the reduced set of user interaction events.

20. The system of claim 19, wherein the reduced set of user interaction events is a subset of the first reduced set of user interaction events, and the one or more policy-based access rules supersede the one or more object or user access permissions.

* * * * *